United States Patent
Ho

(10) Patent No.: US 12,158,942 B2
(45) Date of Patent: Dec. 3, 2024

(54) SECURITY TOKEN PROVISIONING FOR A PRODUCT

(71) Applicant: Lennox Industries, Inc., Richardson, TX (US)

(72) Inventor: Nguyen Trong Ho, Highland Village, TX (US)

(73) Assignee: Lennox Industries Inc., Richardson, TX (US)

( * ) Notice: Subject to any disclaimer, the term of this patent is extended or adjusted under 35 U.S.C. 154(b) by 199 days.

(21) Appl. No.: 17/853,215

(22) Filed: Jun. 29, 2022

(65) Prior Publication Data

US 2024/0004984 A1 Jan. 4, 2024

(51) Int. Cl.
*G06F 21/44* (2013.01)
*G06F 21/73* (2013.01)

(52) U.S. Cl.
CPC .............. *G06F 21/44* (2013.01); *G06F 21/73* (2013.01)

(58) Field of Classification Search
CPC ................................. G06F 21/44; G06F 21/73
See application file for complete search history.

(56) References Cited

U.S. PATENT DOCUMENTS

| | | | |
|---|---|---|---|
| 2013/0318592 A1* | 11/2013 | Grier, Sr. | G06Q 40/02 726/9 |
| 2015/0372825 A1* | 12/2015 | Park | G06F 21/44 713/156 |
| 2016/0127902 A1* | 5/2016 | Ciarniello | G06F 21/43 380/247 |
| 2017/0178090 A1* | 6/2017 | Sarin | G06Q 20/3224 |
| 2017/0201504 A1* | 7/2017 | Funk | H04L 63/0471 |
| 2018/0351948 A1* | 12/2018 | De Jong | H04L 9/0866 |
| 2020/0092283 A1* | 3/2020 | Parkinson | H04L 63/0807 |
| 2020/0162538 A1* | 5/2020 | Sui | G06F 11/1658 |
| 2020/0322134 A1* | 10/2020 | Duval | H04L 9/083 |
| 2023/0008333 A1* | 1/2023 | Mittal | G06F 21/604 |
| 2023/0239165 A1* | 7/2023 | Young | H04L 9/0891 713/175 |
| 2023/0275888 A1* | 8/2023 | Zeng | H04L 9/0656 713/156 |

* cited by examiner

*Primary Examiner* — Jung W Kim
*Assistant Examiner* — Alan L Kong
(74) *Attorney, Agent, or Firm* — Baker Botts L.L.P.

(57) ABSTRACT

An apparatus stores a security token in a memory associated with the apparatus. The security token is a software security artifact used to uniquely identify the apparatus. The apparatus receives a query message to provide the security token. The apparatus transmits the security token to be verified. In response to the security token being verified, the apparatus participates in a secured communication channel with a user device. The apparatus receives a second security token that is used for a subsequent authentication of the apparatus. The apparatus stores the second security token in the memory.

13 Claims, 9 Drawing Sheets

SECURITY TOKEN PROVISIONING FOR A PRODUCT

TECHNICAL FIELD

The present disclosure relates generally to cryptography and security, and more specifically to security token provisioning for a product.

BACKGROUND

Users of devices (such as devices in Heating, Ventilation, and Air Conditioning (HVAC) systems) want to authenticate and verify that the devices are not counterfeit products. The manufacturer of the devices is responsible to provide an authentication method for the devices. It is challenging to provide reliable security to the authentication method for verifying the devices. The current technology lacks the ability to provide a reliable and secure authentication method for the devices.

SUMMARY

The system described in the present application provides several practical applications and technical advantages that overcome the current technical problems described herein. The following disclosure is particularly integrated into a practical application of improving the security in the authentication method of products, devices, apparatuses, and components collectively referred to herein as products. The disclosed system is further integrated into an additional practical application of detecting errors and failures in the implemented authentication method for the products, providing a technical solution to address and remedy the detected errors and failures, and providing a reliable and efficient authentication method for the products. Thus, the present disclosure is configured to provide a failure-tolerant and failure-resistant system and method for providing security to products.

These practical applications provide several technical advantages, including improving the information security technology, for example, by providing a more reliable, efficient, and secure authentication method for the products, and improving the underlying operations of the authentication method of products, for example, by detecting errors and failures in the implemented authentication method and addressing the detected errors and failures. These practical applications are described in greater detail further below.

Authenticating Products Using Software Security Tokens from Perspective of a Remote Server The present disclosure contemplates systems and methods for authenticating products using software security tokens. Examples of a product may include components in a Heating, Ventilation, and Air Conditioning (HVAC) system, such as thermostats, furnace motors, processors, etc., and/or any other device or component.

In any industry, it is desired to authenticate and verify a product and determine that the product is not fake or counterfeit. One potential approach to authenticate a product is to install a hardware security module (e.g., a processor with a memory) in the product. However, this approach suffers from several drawbacks. For example, in some cases, the hardware security module may be vulnerable to hacking by bad actors. In another example, if the hardware security module becomes non-operational, the product may become vulnerable to hacking and/or become non-operational as well. In this example, the product and/or the hardware security module may need to be repaired or replaced.

The hardware security module installed in a product may not be dispensable—meaning that once it is installed in the product, it cannot be replaced, renewed, or updated. This reduces or limits the flexibility in providing security in the authentication method for the product.

In some cases, a new model of the product may be produced that is not compatible with the existing hardware security module. In such cases, the hardware security module may physically lack the capability to interface with the new model of the product. Thus, even if a software code in the hardware security module can be replaced, the lack of physical interface capability with the new model of product limits the flexibility in using the hardware security module in the authentication method for the product.

To address the foregoing drawbacks, the disclosed system is configured to provide a technological solution for providing a more reliable security and authentication method for products by implementing software tokens into the products.

One technical advantage of this technology is that the software tokens are dispensable—meaning that they can be updated and/or replaced. When a product is being authenticated, the software token that is installed in the product may be redeemed. Once the product is authenticated and the token is redeemed, the disclosed system provides a new token to be installed in the product for the next time the authentication of the product is requested. This operation may repeat every time the authentication of the product is requested. In this way, the product is authenticated every time its authentication is requested. This provides a more reliable and secure authentication method for the product.

Another technical advantage of this technology is that the software tokens provide flexibility in providing security in the authentication method for the products. For example, even if a new line of products is produced, the firmware or memory of the new model that stores the existing software code is still able to store the software code. Accordingly, the disclosed system is integrated into a practical application of providing a more reliable and efficient security and authentication method for the products.

In some cases, the process of providing the tokens to a location where the products are manufactured may suffer from a poor wireless communication network. For example, the manufacturer of the products may be in another country as opposed to where the tokens are generated and issued.

The disclosed system may implement one or more redundant token dispensers at the manufacturer to receive tokens from a remote server that is tasked to provide tokens to the manufacturer of the products. Thus, if one token dispenser goes offline, the wireless communication between the token dispenser and the remote server is disconnected or interrupted, and/or the wireless communication network speed reduces (e.g., to less than a threshold speed), the disclosed system may establish another wireless communication channel between the remote server and another token dispenser at the manufacturer.

In another example, in poor wireless communication conditions, the disclosed system may transmit the tokens to the manufacturer in batches, such that even in poor wireless communication conditions where the communication channels are not reliable and the data transfer speed is slow, the disclosed system can provide the tokens to the manufacturer. For example, if the disclosed system determines that the communication channel reliability is not optimal to transfer a file that includes the tokens at once, the disclosed systems may divide the file into multiple batch files and transfer each batch file one at a time to the manufacturer. For example, if the size of the file is large (e.g., 500 Mega byte (Mb), 600 Mb, etc.) and the network communication speed is slow (e.g., 10 kilobyte per second (kbps), 12 kbps, etc.), the disclosed system may determine that the communication channel reliability is not optimal to transfer the file at once, divide the file into multiple batch files, and transfer each batch file one at a time to the manufacturer.

Accordingly, the disclosed system is further configured to provide a reliable technological solution to provide tokens even in poor wireless communication scenarios where the wireless communication network is not reliable.

Furthermore, the disclosed system is configured to detect failures and errors in every operation used in providing the tokens, programming the products with tokens, and authenticating the products using the tokens. For example, in a training process, various failures and errors may be injected into the communication paths between the components of the disclosed system and/or in various operations. Examples of such failures and errors may include 1) requesting tokens more than an allowed number that is set by a policy rule, 2) allocating more than a threshold number of tokens to a token dispenser, 3) receiving tokens for an incorrect product line, 4) receiving a message indicating that no token is available, and 5) receiving a message advising that try requesting tokens after a particular time period (e.g., one week, two weeks from now, etc.), among other error and failure injections.

The disclosed system is configured to detect such errors and failures. The system is configured to operate based on rules to address such errors and failures. For example, if it is detected that more than the threshold (e.g., allowed) number of tokens are requested, the disclosed system is configured to reduce the number of requested tokens to be lower than or equal to the threshold (e.g., allowed) number of tokens. In other error and failure cases, the disclosed system is configured to address each case according to the rules. Thus, the production rate of the products may not be interrupted as a result such errors and failures, such as not receiving the tokens to program the products in a timely manner.

Therefore, the disclosed system is further integrated into an additional practical application of detecting various errors and failures and addressing them to improve the underlying operation of computing devices to be able to provide tokens and program the products with tokens in a timely manner. This improves the production rate and reduces production flow interruptions.

Furthermore, by detecting and addressing the errors and failures in communications between the computing devices of the disclosed system, the downtime of the computing devices of the disclosed system is reduced. Accordingly, the disclosed system provides a secure and failure tolerant token provisioning date path that is able to efficiently deliver tokens and program products with tokens in a timely manner.

In one embodiment, a component authentication and validation system comprises a network interface operably coupled with a processor. The network interface is configured to transmit a first request to receive a security token to be stored in a component associated with a product line. The processor receives the security token, where the token is a software security artifact that is used to uniquely identify the component. The processor associates the security token with a unique identifier that uniquely identifies the security token. The processor receives a second request to transmit the security token for the product line. The processor transmits the security token to a production line server. The processor receives a report file comprising the security token that is stored into the component. The processor registers the programmed token with a token server, wherein registering the security token with the token server comprises transmitting the security token to the token server, such that inquiries about the security token are tracked by the token server.

Authenticating Products Using Software Security Tokens from Perspective of a Production Line Server The present disclosure contemplates systems and methods for providing security tokens to the production line server that is configured to program products with the received security tokens. For example, the production line server may request a remote server to provide a plurality of security tokens to program products associated with a product line. The product line may be associated with a particular model of a product or a different type of product. The production line server is configured to program each product with a different security token.

The production line server may report a list of programmed tokens to the remote server. This list may include the programmed tokens, serial numbers of products that are programmed with the tokens, and any other suitable information. The list of programmed tokens may be transmitted to a token server. In this manner, enquiries about the programmed tokens are tracked. For example, any time authentication or validation of a product (or its respective token) is requested, the previously programmed token is compared with the token that is requested to be verified.

The production line server is further configured to detect tokens that are not and will not be programmed into products. For example, some tokens may not be used because there are no products left. The production line server tags the unused tokens as disregarded tokens and transmits the disregarded tokens to the remote server. The remote server may forward the disregard tokens to the token server. The token server may track the disregarded tokens so that they cannot be used. This increases the security of the programmed products. For example, assume that bad actor gains unauthorized access to a product (e.g., a counterfeit product) and programs it with a disregarded token. When the bad actor initiates a request to authenticate the disregarded token, the token server detects that this is a disregarded token and thus the product is a counterfeit product. This is another example that the disclosed system is integrated into a practical application of improving security to authentication method for verifying products and hence the products themselves.

In one embodiment, a system for authenticating components using software security tokens comprises a network interface operably coupled with a processor. The network interface is configured to transmit a first request to provide a security token to store in a component comprising a thermostat. The processor receives the security token. The security token is a software security artifact that is used to uniquely identify the component. The security token is associated with a unique identifier that uniquely identifies the security token. The processor stores the security token at the component. The processor associates the component with the security token such that the security token is retrievable upon request for authenticating the component, where the security token is used to authenticate the component. The processor generates a report file comprising the security token. The processor transmits the report file to a remote server.

A Product that Utilizes a Security Token

The present disclosure further contemplates an apparatus (e.g., a product) that is configured to be authenticated by a security token that is programmed into the product. When a user initiates a request to authenticate or verify the product, the security token (that is already stored at the product) is transmitted to a token server. The token server verifies the security token, similar to that described above. Once the product is authenticated, a secure communication channel is established between the product and the user device such that the product can be controlled from the user device. In other words, the product is paired with the user device. In a particular example, if the product is a thermostat, once paired with the user device, the temperature of the thermostat can be changed from a software or mobile application on the user device.

In one embodiment, an apparatus that utilizes a security token comprises a memory and a processor. The memory is configured to store a security token, wherein the security token is a software security artifact used to uniquely identify the apparatus. The processor is operably coupled with the memory. The processor receives a query message to provide the security token. The processor transmits the security token to be verified. In response to the security token being verified, the processor participates in a secured communication channel with a user device. The processor receives a second security token, where the second security token is used for a subsequent authentication of the apparatus. The processor stores the second security token in the memory.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide an efficient, secure, and reliable solution for authenticating products, devices, and components (such as devices in Heating, Ventilation, and Air Conditioning (HVAC) systems). Embodiments of the present disclosure and its advantages may be understood by referring to FIGS. 1 through 9. FIGS. 1 through 9 are used to describe systems and methods for authenticating and verifying products using software tokens.

System Overview

Figure 1:
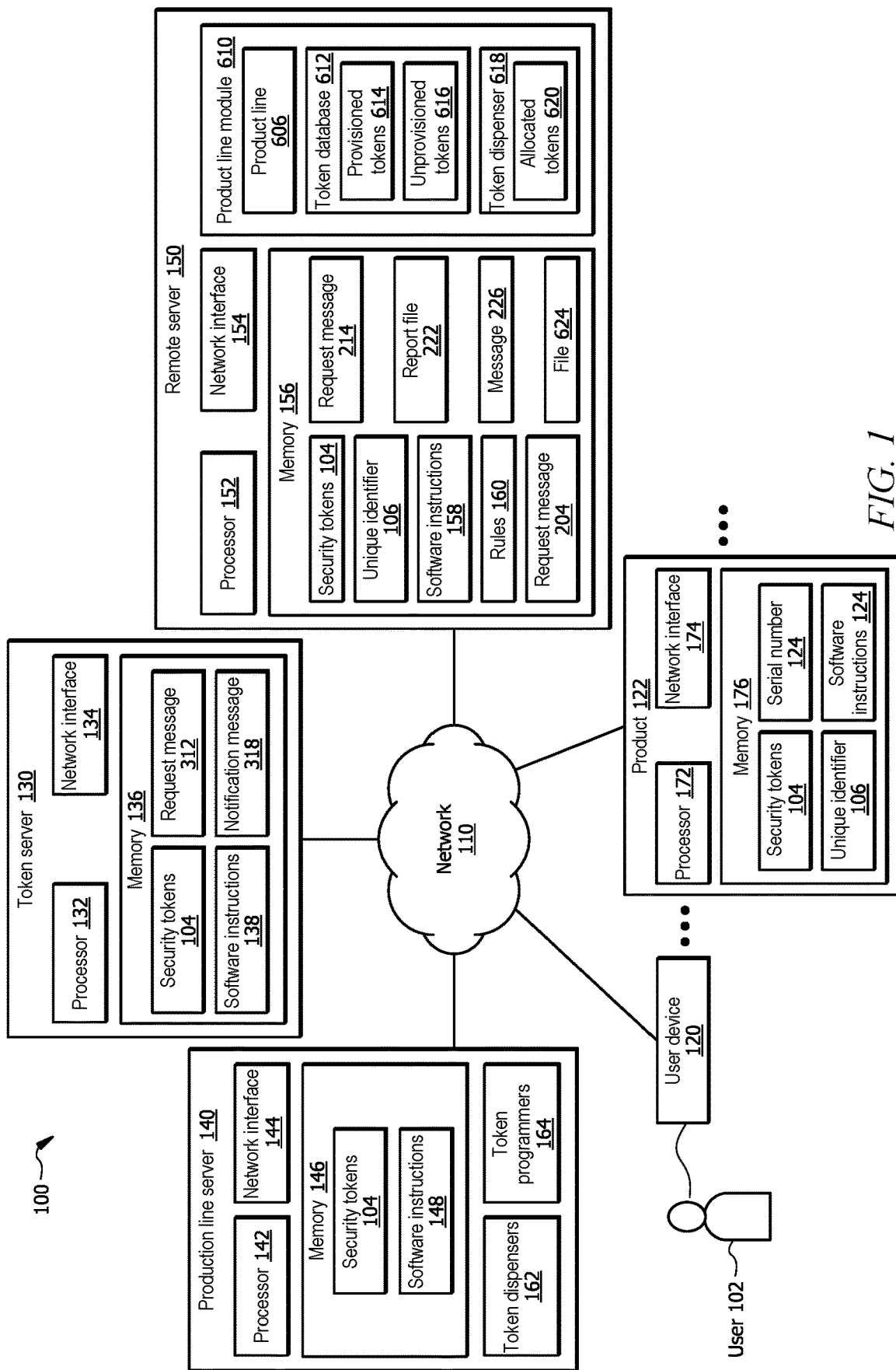
FIG. 1 illustrates an embodiment of a system configured to authenticate and verify products using software tokens.

FIG. 1 illustrates an embodiment of a system 100 that is generally configured to program software tokens 104 into products 122 and authenticate each product 122 based at least in part upon validating its respective token 104. In certain embodiments, system 100 comprises a remote server 150 communicatively coupled with one or more user devices 120, one or more products 122, a production line server 140, and a token server 130 via a network 110. Network 110 enables the communication between the components of the system 100. Product 122 (also referred to herein as an apparatus and component) comprises a processor 172 in signal communication with a memory 176. Memory 176 stores software instructions 178 that when executed by the processor 172, cause the product 122 to perform one or more operations described herein. Token server 130 comprises a processor 132 in signal communication with a memory 136. Memory 136 stores software instructions 138 that when executed by the processor 132, cause the token server 130 to perform one or more operations described herein. Production line server 140 comprises a processor 142 in signal communication with a memory 146. Memory 146 stores software instructions 148 that when executed by the processor 142, cause the production line server 140 to perform one or more operations described herein. Remote server 150 comprises a processor 152 in signal communication with a memory 156. Memory 156 stores software instructions 158 that when executed by the processor 152, cause the remote server 150 to perform one or more operations described herein. In other embodiments, system 100 may not have all of the components listed and/or may have other elements instead of, or in addition to, those listed above.

Software security tokens 104 may be used to authenticate products 122. Examples of a product 122 may include components in an HVAC system, such as thermostats, furnace motors, processors, etc., and/or any other device, apparatus, or component. Each product 122 may be programmed with a respective and unique token 104. A token 104 that is programmed into a product 122 may be used to uniquely identify the product 122. In certain embodiments, the authentication of a product 122 may include determining that the product 122 is not a counterfeit product.

One potential approach to authenticate a product 122 is to implement a hardware security module (e.g., a hardware processor and a memory, a firmware) into the product 122. However, this approach suffers from several drawbacks. For example, in some cases, the hardware security module may be vulnerable to hacking by bad actors. In another example, if the hardware security module becomes non-operational (e.g., due to a bug in code or a physical malfunctioning), the product 122 may become vulnerable to hacking and/or also become non-operational. In another example, the hardware security module is not dispensable—meaning that once it is installed in a product 122, it can not be replaced, renewed, or updated. This reduces or limits the flexibility in providing security and authentication methods to the product 122, e.g., when an update is needed.

The system 100 is configured to provide a solution for providing a more reliable and secure authentication method for products 122 by deploying software tokens 104 into the products 122. The software tokens 104 are dispensable—meaning that they can be updated and/or replaced. When a product 122 is being authenticated, the software token 104 that is installed in the product 122 may be redeemed (e.g., fetched). Once the product 122 is authenticated and the token 104 is redeemed, system 100 provides a new token 104 to be installed in the product 122 for the next time the authentication of the product 122 is requested. This operation may repeat every time the authentication of the product 122 is requested. Accordingly, system 100 is integrated into a practical application of providing a more efficient, secure, and reliable authentication method for the products 122.

In some cases, the process of providing the tokens 104 to a place where the products 122 are manufactured may suffer from a poor wireless communication network. For example, the manufacturer of the product 122 may be in another country compared to where the tokens 104 are generated and issued. The system 100 may implement one or more redundant token dispensers 162 to receive tokens from the remote server 150. Thus, if one token dispenser 162 goes offline, the wireless communication between the token dispenser 162 and the remote server 150 is disconnected or interrupted, and/or the wireless communication network speed reduces (e.g., less than a threshold speed), the system 100 may establish another wireless communication channel between the remote server 150 and another token dispenser 162. Accordingly, the system 100 is further configured to provide a reliable technological solution to providing tokens 104 even in poor wireless communication conditions where the wireless communication network is not reliable.

Furthermore, the system 100 is configured to detect failures and errors in every operation and communication between the components of the system 100 (e.g., errant requests and errant responses) and address the detected failures and errors. For example, in a training process, various failures and errors may be injected into the communication paths between the components of the system 100. Examples of such failures and errors may include 1) requesting tokens 104 more than an allowed number (e.g., 10000, 15000, etc.) that is set by a policy rule 160 (i.e., token number threshold violation), 2) allocating more than a threshold number of tokens 104 to a token dispenser 618 (see FIG. 6) or 162 (i.e., max bulk token allotted), 3) receiving tokens 104 for an incorrect product line (i.e., product line error injection), 4) receiving a message indicating that no token 104 is available (i.e., token availability error), and 5) receiving a message indicating to try requesting tokens 104 after a particular time (e.g., one week, two weeks from now, etc.) (i.e., try again error), among other error and failure injections. These error failure injections are described in more detail in FIG. 6. The system 100 is configured to detect such errors and failures. The system 100 is configured to operate based on rules 160 to address such errors and failures. For example, if it is detected that more than the threshold (e.g., allowed) number of tokens 104 is requested, system 100 is configured to reduce the number of requested tokens 104 to be lower than or equal to the threshold (e.g., allowed) number of tokens 104. In other error and failure cases, the system 100 is configured to address each case according to the rules 160. The operations of the system 100 addressing such errors and failures are described in greater detail in FIG. 6. Thus, the production rate of the products 122 may not be interrupted as a result such errors and failures, such as not receiving the tokens 104 to program the products 122 in a timely manner.

Therefore, system 100 is further integrated into an additional practical application of detecting various errors and failures and addressing them to improve the underlying operation of the remote server 150 and the production line server 140 to be able to provide tokens 104 to program the products 122 in a timely manner and thus improving the production rate and reducing production flow interruptions.

Furthermore, by detecting and addressing the errors and failures in communications between the components of the system 100, the downtime of the remote server 150, the production line server 140 is reduced. The secure token provisioning date path is able to provide a secure and failure tolerant token provisioning date path that is able to efficiently deliver tokens 104 and program products 122 with tokens 104 in a timely manner. Thus, the system 100 is able to recover from any intermediate wireless communication failure or issue. The system 100 is further configured to provide a scalable solution in providing tokens 104 such that it can support an increase in the production rate of the products 122.

System Components

Network

Network 110 may be any suitable type of wireless and/or wired network. The network 110 is not connected to the Internet or a public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network 110 may be configured to support any suitable type of communication protocol as would be appreciated by one of ordinary skill in the art.

User Device

User device 120 is generally any device that is configured to process data and interact with users 102. Examples of the user device 120 include, but are not limited to, a personal computer, a desktop computer, a workstation, a server, a laptop, a tablet computer, a mobile phone (such as a smartphone), etc. The user device 120 may include a user interface, such as a display, a microphone, keypad, or other appropriate terminal equipment usable by users. The user device 120 may include a hardware processor, memory, and/or circuitry (not explicitly shown) configured to perform any of the functions or actions of the user device 120 described herein. For example, a software application designed using software code may be stored in the memory and executed by the processor to perform the functions of the user device 120. The user device 120 is configured to communicate with other devices via the network 110, such as the product 122.

In an example scenario, when a user 102 wants to authenticate the product 122, the user 102 may use the user device 120 to query a token 104 that is programmed in the product 122. The user device 120 may receive the token 104, serial number 124 of the product 122, and a unique identifier 106 associated with the token 104 from the product 122. The user device 120 may transmit this information to the token server 130. The user device 120 may request the token server 130 to verify the token 104.

The token server 130 may verify the token 104 based on determining whether the token 104 was already programmed in a product 122 with the received serial number 124 based on the token 104, the serial number 124, and the unique identifier 106. If it is determined that the token 104 (received from the user device 120) matches the token 104 (that was previously programmed in the product 122 with the serial number 124), the token server 130 verifies the token 104. The token server 130 sends a message indicating that the token 104 is valid to the user device 120. Thus, the product 122 is validated and authenticated via the token server 130 and the user device 120. In response, the product 122 is paired with the user device 120, e.g., the product 122 can be controlled from the user device 120 using a software application installed on the user device 120.

Product

Product 122 is generally any device, apparatus, or component, such as a device in an HVAC system, e.g., a thermostat, a furnace motor, a processor, a processing circuit, etc., and/or any other device, apparatus, or component. The product 122 may be configured to process data and interact with users 102. The product 122 may include a hardware processor, firmware, memory, and/or circuitry configured to perform any of the functions or actions of the product 122 described herein.

The product 122 may be configured to operate as described further below and in conjunction with the operational flows 200-400 and 600-700 described in FIGS. 2-4 and 6-7, respectively, and the methods 500, 800, and 900 described in FIGS. 5, 8, and 9, respectively.

In certain embodiments, the product 122 includes a processor 172 in signal communication with a network interface 174 and memory 176. Processor 172 comprises one or more processors operably coupled to the memory 176. The processor 172 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 172 may be a programmable logic device, a microcontroller, a microprocessor, or any suitable combination of the preceding. The one or more processors are configured to process data and may be implemented in hardware or software. For example, the processor 172 may be 8-bit, 16-bit, 32-bit, 64-bit, or of any other suitable architecture. The processor 172 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 178) to implement the processor 172. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-9. For example, the processor 172 may be configured to perform one or more operations of operational flows 200-400 and 600-700 described in FIGS. 2-4 and 6-7, respectively, and the methods 500, 800, and 900 described in FIGS. 5, 8, and 9, respectively.

Network interface 174 is configured to enable wired and/or wireless communications. The network interface 174 may be configured to communicate data between the product 122 and other devices, systems, or domains. For example, the network interface 174 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 172 may be configured to send and receive data using the network interface 174. The network interface 174 may be configured to use any suitable type of communication protocol.

The memory 176 may be volatile or non-volatile and may comprise ROM, RAM, TCAM, DRAM, and SRAM. The memory 176 may include one or more of a local database, cloud database, NAS, etc. The memory 176 comprises one or more disks, tape drives, or solid-state drives, and may be used as an over-flow data storage device, to store programs when such programs are selected for execution, and to store instructions and data that are read during program execution. The memory 176 may store any of the information described in FIGS. 1-9 along with any other data, instructions, logic, rules, or code operable to implement the function(s) described herein when executed by processor 172. For example, the memory 176 may store software instructions 178, token 104, unique identifier 106, serial number 124, and/or any other data or instructions.

The software instructions 178 may comprise any suitable set of instructions, logic, rules, or code operable to execute the processor 172 and perform the functions described herein, such as some or all of those described in FIGS. 1-9. For example, a software application designed using software instructions 178 may be stored in the memory 176 and executed by the processor 172 to perform the functions of the product 122. The product 122 is configured to communicate with other devices via the network 110, such as the user device 120 and production line server 140.

Each product 122 is associated with a unique serial number 124. The serial number 124 may be set during the manufacturing of the product 122. The product 122 is programmed with a token 104. The token 104 may represent a software security artifact that is used to identify, authenticate, and verify the product 122. In certain embodiments, the token 104 may include code, text, alphanumerical string, etc. In certain embodiments, the token 104 may include encrypted data, obfuscated data, hashed data, and/or the like.

The token 104 is assigned and associated with a unique identifier 106. The unique identifier 106 uniquely identifies the token 104. The unique identifier 106 may be an alphanumerical string. The token 104, serial number 124, and unique identifier 106 may be stored in a memory (not explicitly shown) of the product 122. In the present disclosure, product 122 may be interchangeably referred to as a component or a device.

Token Server

Token server 130 may generally be a hardware device that is configured to process data and communicate with other components of the system 100 via the network 110. The token server 130 is configured to provide hardware and/or software resources to other components of the system 100 and perform one or more operations as described further below and in conjunction with the operational flows 200-400 and 600-700 described in FIGS. 2-4 and 6-7, respectively, and the methods 500, 800, and 900 described in FIGS. 5, 8, and 9, respectively.

The token server 130 is further configured to issue (e.g., generate) tokens 104, track tokens 104 that are programmed in products 122, track tokens 104 that are associated with the unique identifiers 106 by the remote server 150, track disregarded tokens 104 that are registered by not programmed in any product 122, and validate tokens 104 (e.g., by comparing a token 104 (provided by the user device 120) with each of the tokens 104 (that is previously registered and programmed in products 122). These operations of the token server 130 are described in greater detail in FIGS. 2-9.

In certain embodiments, the token server 130 may be implemented by a cluster of computing devices. For example, the token server 130 may be implemented by a plurality of computing devices using distributed computing and/or cloud computing systems. In another example, the token server 130 may be implemented by a plurality of computing devices in one or more data centers.

In certain embodiments, the token server 130 may include a processor 132 in signal communication with a network interface 134 and a memory 136. Processor 132 comprises one or more processors operably coupled to the memory 136. The processor 132 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The processor 132 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 138) to implement the processor 132. In this way, processor 132 may be a special-purpose computer designed to implement the functions disclosed herein. In an embodiment, the processor 132 is implemented using logic units, FPGAs, ASICs, DSPs, or any other suitable hardware. The processor 132 is configured to operate as described in FIGS. 1-9. For example, the processor 132 may be configured to perform one or more operations of operational flows 200-400 and 600-700 described in FIGS. 2-4 and 6-7, respectively, and the methods 500, 800, and 900 described in FIGS. 5, 8, and 9, respectively.

Network interface 134 is configured to enable wired and/or wireless communications. The network interface 134 may be configured to communicate data between the token server 130 and other devices, systems, or domains. For example, the network interface 134 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 132 may be configured to send and receive data using the network interface 134. The network interface 134 may be configured to use any suitable type of communication protocol.

The memory 136 may be volatile or non-volatile and may comprise read-only memory (ROM), random-access memory (RAM), ternary content-addressable memory (TCAM), dynamic random-access memory (DRAM), and static random-access memory (SRAM). The memory 136 may include one or more of a local database, cloud database, network-attached storage (NAS), etc. The memory 136 comprises one or more disks, tape drives, or solid-state drives, and may be used as an over-flow data storage device, to store programs when such programs are selected for execution, and to store instructions and data that are read during program execution. The memory 136 may store any of the information described in FIGS. 1-9 along with any other data, instructions, logic, rules, or code operable to implement the function(s) described herein when executed by processor 132. For example, the memory 136 may store software instructions 138, tokens 104, request message 312, notification message 318, and/or any other data or instructions. The software instructions 138 may comprise any suitable set of instructions, logic, rules, or code operable to execute the processor 132 and perform the functions described herein, such as some or all of those described in FIGS. 1-9.

Production Line Server

Production line server 140 may generally be a hardware device that is configured to process data and communicate with other components of the system 100 via the network 110. The production line server 140 is configured to provide hardware and/or software resources to other components of the system 100 and perform one or more operations as described further below and in conjunction with operational flows 200-400 and 600-700 described in FIGS. 2-4 and 6-7, respectively, and the methods 500, 800, and 900 described in FIGS. 5, 8, and 9, respectively.

The production line server 140 is further configured to send requests to receive tokens 104 from the remote server 150, fetch the tokens 104, program each token 104 into a respective product 122, report programmed tokens 104 to the remote server 150, identify disregarded tokens 104 (where disregarded tokens 104 are tokens that are registered by the remote server 150 but not used or programmed in any product 122), and report the disregarded tokens 104 to the remote server 150. These operations of the token server 130 are described in greater detail in FIGS. 2-7.

In certain embodiments, the production line server 140 may be implemented by a cluster of computing devices. For example, the production line server 140 may be implemented by a plurality of computing devices using distributed computing and/or cloud computing systems. In another example, the production line server 140 may be implemented by a plurality of computing devices in one or more data centers.

In certain embodiments, various operations of the production line server 140 may be performed by different computing devices in the cluster. For example, one or more operations of the production line server 140 may be performed by one or more token dispensers 162, and one or more other operations of the production line server 140 may be performed by one or more token programmers 164. System 100 may include any number of token dispensers 162 and any number of token programmers 164.

Each token dispenser 162 may generally be a hardware computing device that is configured to process data and communicate with other components of the system 100 via the network 110. Examples of the token dispenser 162 include, but are not limited to, a personal computer, a desktop computer, a workstation, a server, a laptop, a tablet computer, and the like. The token dispenser 162 may include a user interface, such as a display, a microphone, keypad, or other appropriate terminal equipment usable by users. The token dispenser 162 may include a hardware processor (such as processor 142), memory (such as memory 146), and/or circuitry (not explicitly shown) configured to perform any of the functions or actions of the token dispenser 162 described herein. For example, a software application designed using software code may be stored in the memory and executed by the processor to perform the functions of the token dispenser 162. For example, a token dispenser 162 may receive tokens 104 from the remote server 150 and dispense (e.g., distribute) a token 104 (e.g., one at a time) to the token programmer 164 so that the token programmer 164 can program a product 122 with the token 104.

Each token programmer 164 may generally be a hardware computing device that is configured to process data and communicate with other components of the system 100 via the network 110. Examples of the token programmer 164 include, but are not limited to, a personal computer, a desktop computer, a workstation, a server, a laptop, a tablet computer, and the like.

The token programmer 164 may include a user interface, such as a display, a microphone, keypad, or other appropriate terminal equipment usable by users. The token programmer 164 may include a hardware processor (such as an instance of the processor 142), memory (such as an instance of the memory 146), and/or circuitry (not explicitly shown) configured to perform any of the functions or actions of the token programmer 164 described herein. For example, a software application designed using software code may be stored in the memory and executed by the processor to perform the functions of the token programmer 164. For example, the token programmer 164 may receive a token 104 from the token dispenser 162 and program a product 122 with the token 104.

In certain embodiments, token dispenser 162 and the production line server 140 may be implemented and integrated into the same device (as shown in the illustrated embodiment). In certain embodiments, token dispenser 162 and the production line server 140 may be implemented in separate devices in a cluster or cloud of computing devices. In certain embodiments, token programmer 164 and the production line server 140 may be implemented and integrated in the same device (as shown in the illustrated embodiment). In certain embodiments, token programmer 164 and the production line server 140 may be implemented in separate devices in a cluster or cloud of computing devices. In certain embodiments, token dispenser 162 may be implemented in a software module and reside in the memory 146. In certain embodiments, token dispenser 162 may be implemented in a hardware module. In certain embodiments, token programmer 164 may be implemented in a software module and reside in the memory 146. In certain embodiments, token programmer 164 may be implemented in a hardware module.

In certain embodiments, the production line server 140 includes a processor 142 in signal communication with a network interface 144 and memory 146. Processor 142 comprises one or more processors operably coupled to the memory 146. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 148) to implement the processor 142. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-9. For example, the processor 142 may be configured to perform one or more operations of operational flows 200-400 and 600-700 described in FIGS. 2-4 and 6-7, respectively, and the methods 500, 800, and 900 described in FIGS. 5, 8, and 9, respectively. The processor 142 may be further configured to implement the token dispenser(s) 162 and the token programmer(s) 164. Each token dispenser 162 may be implemented by the processor 142 executing the software instructions 148. Each token programmer 164 may be implemented by the processor 142 executing the software instructions 148.

Network interface 144 is configured to enable wired and/or wireless communications. The network interface 144 may be configured to communicate data between the production line server 140 and other devices, systems, or domains. For example, the network interface 144 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be volatile or non-volatile and may comprise ROM, RAM, TCAM, DRAM, and SRAM. The memory 146 may include one or more of a local database, cloud database, NAS, etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-9 along with any other data, instructions, logic, rules, or code operable to implement the function(s) described herein when executed by processor 142. For example, the memory 146 may store software instructions 148, tokens 104, and/or any other data or instructions. The software instructions 148 may comprise any suitable set of instructions, logic, rules, or code operable to execute the processor 142 and perform the functions described herein, such as some or all of those described in FIGS. 1-9.

Remote Server

Remote server 150 may generally be a hardware device that is configured to process data and communicate with other components of the system 100 via the network 110. The remote server 150 is configured to provide hardware and/or software resources to other components of the system 100 and perform one or more operations as described further below and in conjunction with operational flows 200-400 and 600-700 described in FIGS. 2-3 and 6-7, respectively, and the method 500 described in FIG. 5.

The remote server 150 is further configured to send request messages indicating to receive tokens 104 to the token server 130, associate each token 104 with a unique identifier 106, distribute or transmit the tokens 104 to the production line server 140, receive a list of programmed tokens 104 from the production line server 140, register the programmed tokens 104 with the token server 130 (e.g., by sending a message including the programmed tokens 104 and serial numbers 124 of products 122 that the tokens 104 are programmed) indicating that these tokens 104 are programmed in these products 122, and destroy or disregard tokens 104 that are sent to the production line server 140 but are not and will not be programmed into products 122. These operations of the token server 130 are described in greater detail in FIGS. 2-9.

In certain embodiments, the remote server 150 may be implemented by a cluster of computing devices. For example, the remote server 150 may be implemented by a plurality of computing devices using distributed computing and/or cloud computing systems. In another example, the remote server 150 may be implemented by a plurality of computing devices in one or more data centers.

In certain embodiments, the remote server 150 includes a processor 152 in signal communication with a network interface 154 and a memory 156. Processor 152 comprises one or more processors operably coupled to the memory 156. The processor 152 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The processor 152 may include an ALU for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors 152 are configured to execute instructions (e.g., software instructions 158) to implement the processor 152. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-9. For example, the processor 152 may be configured to perform one or more operations of operational flows 200-400 and 600-700 described in FIGS. 2-4 and 6-7, respectively, and the methods 500, 800, and 900 described in FIGS. 5, 8, and 9, respectively. The processor 152 may be further configured to implement the product line module 610 and its subcomponents (i.e., product line 606, token database 612, and token dispenser 618).

Network interface 154 is configured to enable wired and/or wireless communications. The network interface 154 may be configured to communicate data between the remote server 150 and other devices, systems, or domains. For example, the network interface 154 may comprise an NFC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 152 may be configured to send and receive data using the network interface 154. The network interface 154 may be configured to use any suitable type of communication protocol.

The memory 156 may be volatile or non-volatile and may comprise ROM, RAM, TCAM, DRAM, and SRAM. The memory 156 may include one or more of a local database, cloud database, NAS, etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-9 along with any other data, instructions, logic, rules, or code operable to implement the function(s) described herein when executed by processor 152. For example, the memory 156 may store software instructions 158, tokens 104, unique identifiers 106, report file 222, rules 160, request messages 204, 214, message 226, file 624, and/or any other data or instructions. The software instructions 158 may comprise any suitable set of instructions, logic, rules, or code operable to execute the processor 152 and perform the functions described herein, such as some or all of those described in FIGS. 1-9.

Product Line Module

Product line module 610 is generally a software and/or hardware module, and configured to manage tokens 104 for products 122 associated with a particular product line 606. The product line module 610 may be implemented by the processor 152 executing the software instructions 158. The product line module 610 includes a token database 612 and one or more token dispensers 618.

Each of product line modules 610a and 610b (described in FIG. 6) is an instance of a product line module 610. The product line module 610 may further be configured to manage the production of products 122 associated with a product line 606 and assigning tokens 104 to the products 122. The product line module 610 may be stored in a memory space in the memory 156 where the product line 606 is managed. The product line module 610 determines which tokens 104 (received from the token server 130) to be used for the product line 606. The product line 606 may interchangeably referred to herein as a component line. Operations of the remote server 150 with respect to the product line module 610 are described in greater detail in FIG. 6.

The product line modules 610 is associated with the product line 606. The remote server 150 may include and/or be associated with multiple product lines modules 610 each associated with a particular product line 606 and configured to manage tokens 104 for products 122 associated with the respective product line 606. In certain embodiments, the product line module 610 may be implemented in a software module and integrated into the remote server 150. In certain embodiments, the product line module 610 may be implemented in a separate device as the remote server 150 and be in signal communication with the remote server 150 and other components of the system 100.

The token database 612 generally comprises any storage architecture. Examples of the token database 612 include, but are not limited to, a network-attached storage cloud, a storage area network, a storage assembly directly (or indirectly) coupled to one or more components of the remote server 150. The token database 612 stores provisioned tokens 614 and un-provisioned tokens 616. The provisioned tokens 614 may include tokens 104 that are programmed into products 122 associated with the product line 606. For example, when a token 104 is programmed into a product 122 associated with the product line 606 (e.g., as described in FIG. 2), it is communicated to the remote server 150 in a report file 222 (see FIG. 2). The remote server 150 may store the programmed token 104 in the token database 612 as a provisioned token 614. The un-provisioned tokens 616 may include tokens 104 that are not yet programmed in products 122 associated with the product line 606. For example, when the remote server 150 receives a token 104 for the product line 606 from the token server 130, the remote server 150 associates token 104 with a unique identifier 106 and stores it as an un-provisioned token 616 in the token database 612*a*.

In certain embodiments, the token dispenser 618 may be a node (e.g., a network node, a computing device, and the like) that is in signal communication with the production line server 140 and other components of the system 100. In certain embodiments, the token dispenser 618 may be a software module. In certain embodiments, the token dispenser 618 may be a hardware computing device that is configured to process data and communicate with other components of the system 100 via the network 110.

In certain embodiments, the token dispenser 618 may be integrated into the remote server 150. In certain embodiments, the token dispenser 618 may be implemented in a separate device compared to the remote server 150. Examples of the token dispenser 618 include but are not limited to, a personal computer, a desktop computer, a workstation, a server, a laptop, a tablet computer, and the like. The token dispenser 618 may include a user interface, such as a display, a microphone, keypad, or other appropriate terminal equipment usable by users. The token dispenser 618 may include a hardware processor, memory, and/or circuitry (not explicitly shown) configured to perform any of the functions or actions of the token dispenser 618 described herein. For example, a software application designed using software code may be stored in the memory and executed by the processor to perform the functions of the token dispenser 618.

The token dispenser 618 stores allocated tokens 620. When the remote server 150 receives a request to provide tokens 104 for the product line 606 from the production line server 140, it retrieves the requested number of tokens 104 from the un-provisioned tokens 616 and delivers them to the token dispensers 618. The product line module 610 may include any suitable number of token dispensers 618. The operations of the product line module 610 are described in greater detail in FIG. 6.

Operational Flow for Programming a Product with a Software Token

Figure 2:
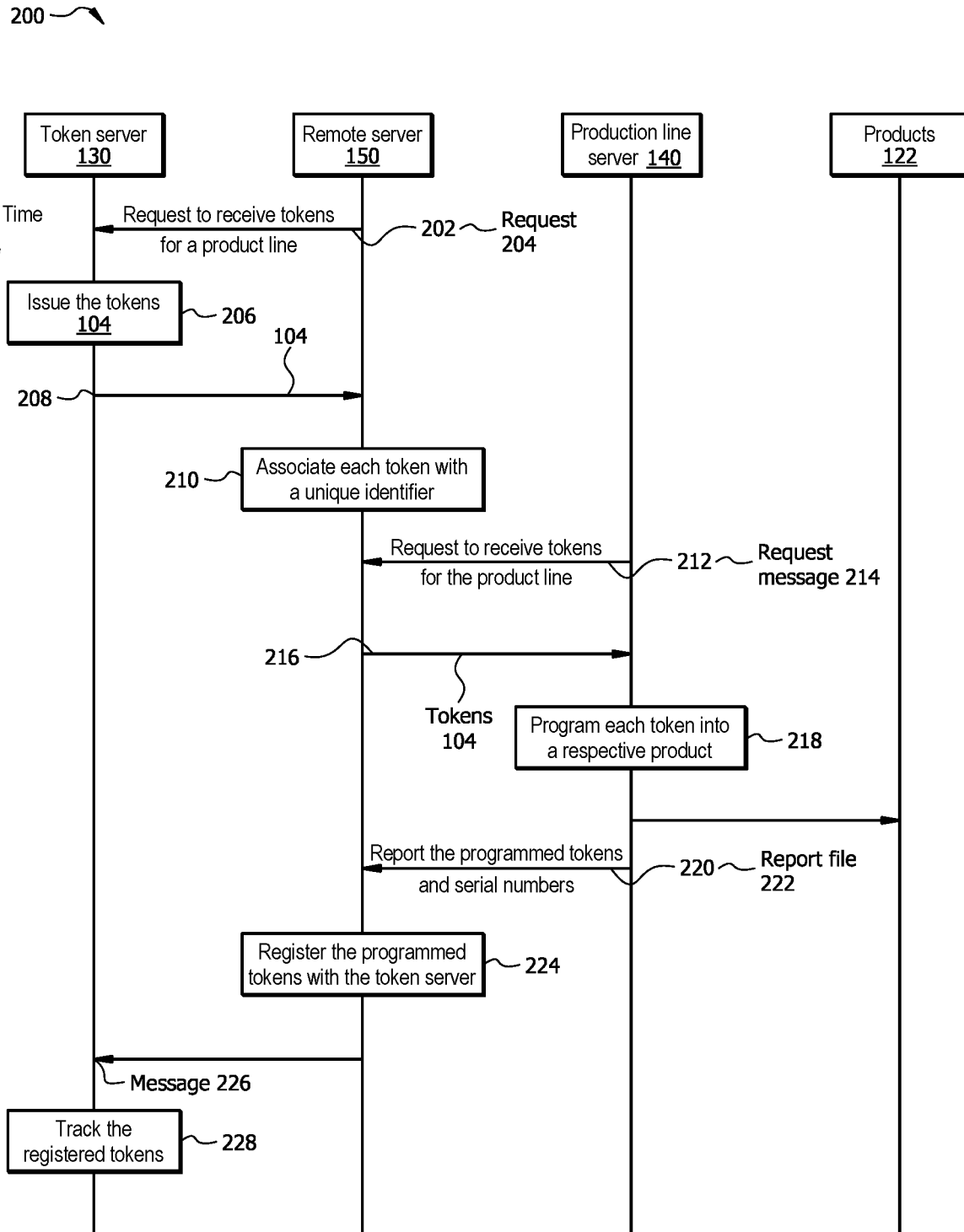
FIG. 2 illustrates an example operational flow of system of FIG. 1 for programming products with software tokens.

FIG. 2 illustrates an example operational flow 200 of system 100 (see FIG. 1) for programming a product 122 with a software token 104. Modifications, additions, or omissions may be made to the operational flow 200. The operational flow 200 may include more, fewer, or other operations. For example, operations may be performed in parallel or in any suitable order.

The operational flow 200 may begin at operation 202 when the remote server 150 sends a request 204 indicating to receive a particular number of tokens 104 for a particular product line to the token server 130. The particular number of tokens 104 may be any suitable value (e.g., 10000, 15000, etc.) and be set according to the rules 160. The particular product line may be related to a particular model of the product 122 or a different product 122. For example, an administrator operating the remote server 150 may initiate the request 204. In another example, when the number of tokens 104 at the remote server 150 reaches less than a threshold percentage of full capacity (e.g., less than 70%, 80%, etc.), the remote server 150 may transmit the request 204 to the token server 130 automatically according to the rules 160. Each token 104 from among the plurality of tokens 104 is a software security artifact that is used to uniquely identify a product 122.

At operation 206, the token server 130 issues (e.g., produces or generates) the particular number of tokens 104. The token server 130 may implement a token generating algorithm, a random number/code generator, and the like to issue the tokens 104.

At operation 208, the token server 130 transmits the tokens 104 to the remote server 150. At operation 210, the remote server 150 processes the tokens 104 and associates each token 104 with a unique identifier 106. In the present disclosure, this process may be referred to as warehousing the tokens 104. When the production line server 140 wants to program the products 122 with tokens 104, it may transmit a request 214 to the remote server 150.

At operation 212, the production line server 140 transmits the request 214 to receive a number of tokens 104 for the product line to the remote server 150. For example, the production line server 140 may request to receive 200, 300, or any suitable number of tokens 104. For example, an administrator operating the production line server 140 may initiate the request 214. In another example, when the number of tokens 104 at the production line server 140 reaches less than a threshold percentage of full capacity (e.g., less than 70%, 80%, etc.), the production line server 140 may transmit the request 214 to the remote server 150 automatically according to the rules 160. The remote server 150 receives the request 214. At operation 216, the remote server 150 transmits the requested number of tokens 104 to the production line server 140.

At operation 218, the production line server 140 may program each token 104 into a respective product 122. In certain embodiments, a token dispenser 162 (see FIGS. 1 and 6) may receive the tokens 104 from the remote server 150 and forward one token 104 at a time to a token programmer 164 (see FIGS. 1 and 6). The token programmer 164 (see FIGS. 1 and 6) may program each token 104 with the respective product 122. Programming a token 104 into a product 122 may include storing the token 104 in a memory 176 associated with the product 122 such that the token 104 is accessible and retrievable upon receiving a request to provide the token 104.

In certain embodiments, the process of programming a product 122 with a token 104 may include implementing an Application Programming Interface (API) request to store the token 104 in an appropriate memory location in the memory of the product 122, such that it can be accessed and validated when requested. In this manner, each of one or more products 122 may be programmed with a respective token 104.

The production line server 140 also reads and fetches the serial number 124 of the product 122 that is programmed with a token 104 (e.g., from the memory of the product 122). The production line server 140 may add the programmed tokens 104 (associated with unique identifiers 106) and the serial numbers 124 of the products 122 that are programmed with tokens 104 to a report file 222.

At operation 220, the remote server 150 receives the report file 222 that includes one or more programmed tokens 104 that are programmed into the products 122. The remote server 150 maps each received programmed token 104 with its respective unique identifier 106 and product 122.

At operation 224, the remote server 150 registers the programmed tokens 104 with the token server 130. In this process, the remote server 150 may transmit a message 226 that includes the programmed tokens 104, the unique identifiers 106, and the particular serial numbers 124 of products 122 that are programmed with the tokens 104 to the token server 130. The message 226 may indicate that the provided tokens 104 are programmed into the particular products 122 with the particular serial numbers 124.

At operation 228, the token server 130 tracks the registered tokens 104. For example, the token server 130 may track the registered tokens 104 such that inquiries about the programmed tokens 104 are tracked and monitored. For example, when a user 102 (see FIG. 1) wants to authenticate a product 122, the token server 130 may have information about the token 104 that is programmed into the product 122, including the unique identifier 106 and the serial number 124 of the product 122.

The token server 130 may use the token 104, the unique identifier 106, and the serial number 124 to validate the token 104 and in response determine that product 122 is authenticated (e.g., it is not a counterfeit product). The process of validating the token 104 and determining that the product 122 is authenticated or not is described in greater detail in FIG. 3.

Operational Flow for Authenticating a Product Using a Software Token

Figure 3:
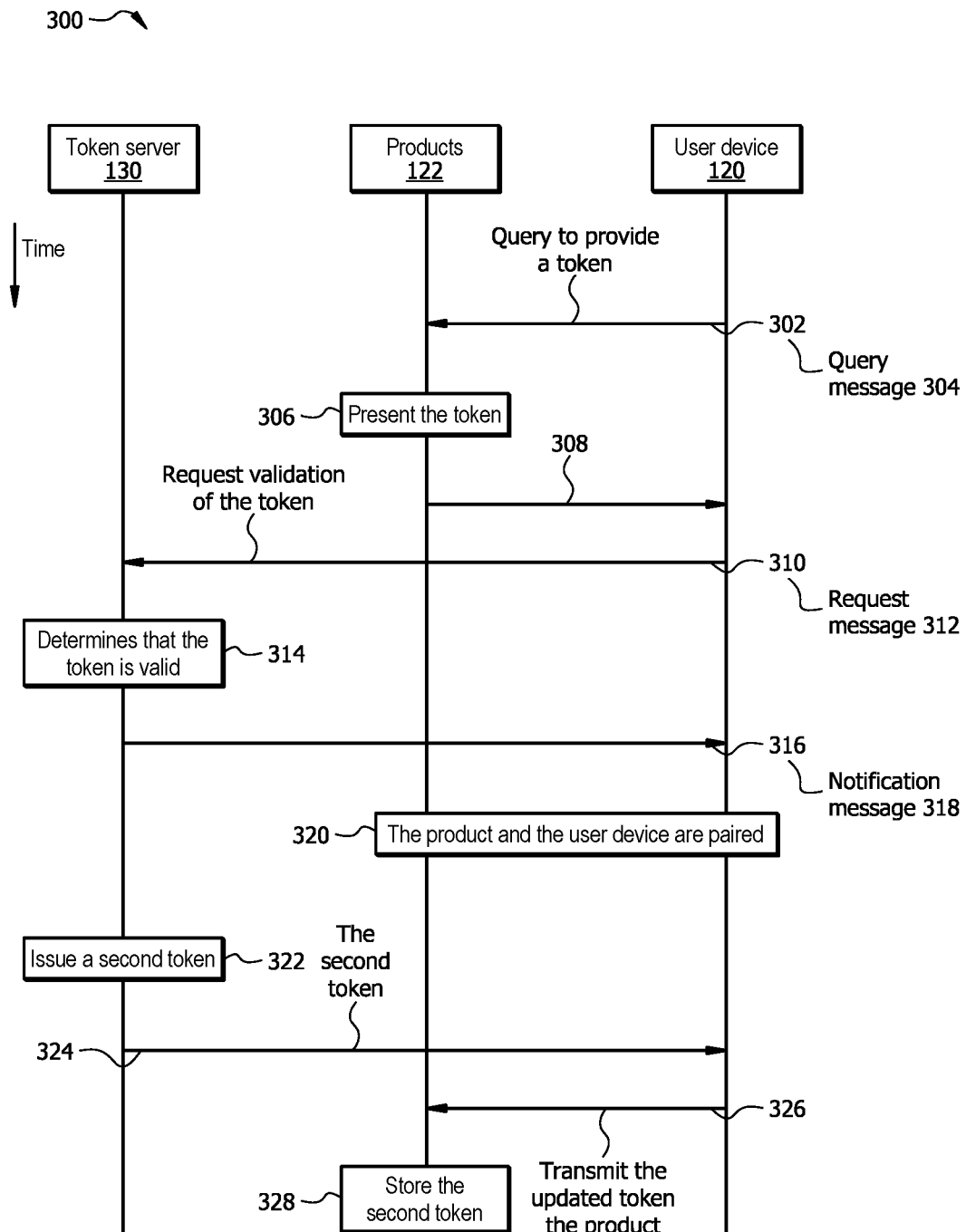
FIG. 3 illustrates an example operational flow of the system of FIG. 1 for authenticating and verifying products using software tokens.

FIG. 3 illustrates an example operational flow 300 for authenticating a product 122 using a software token 104. Modifications, additions, or omissions may be made to the operational flow 200. The operational flow 300 may include more, fewer, or other operations. For example, operations may be performed in parallel or in any suitable order. The operational flow 300 may occur after the operational flow 200 described in FIG. 2. For example, the operational flow 300 may be a continuation of the operational flow 200. In the illustrated example, assume that the product 122 is already programmed with a token 104 by the production line server 140, similar to that described in FIG. 2.

The operational flow 300 may begin at operation 302 where the user device 120 queries the product 122 to provide a token 104. For example, the user device 120 may send a query message 304 to the product 122, where the query message 304 indicates to provide a token 104. For example, a user 102 (see FIG. 1) operating the user device 120 may want to authenticate the product 122 and pair the product 122 with the user device 120. In certain embodiments, the user 102 may initiate requesting to provide the token 104 from the user device 120. In response, the user device 120 may send the query message 304 to the product 122. The query message 304 may be an API request that is configured to interface with the processor of the product 122 to read and retrieve the token 104. The product 122 receives the query message 304.

At operation 306, the product 122 presents the token 104. In certain embodiments, the product 122 may transmit the token 104 to the user device 120 via wired and/or wireless communication channels, e.g., WiFi or Bluetooth. At operation 308, the user device 120 receives the token 104 from the product 122.

At operation 310, the user device 120 requests the token server 130 to validate the token 104. For example, the user device 120 may send a request message 312 that indicates to validate the token 104 to the token server 130.

At operation 314, the token server 130 determines that the token 104 is valid. Since it is assumed in the illustrated example of operational flow 300 that the product 122 is already programmed with the token 104, at 314, the token server 130 determines that the token 104 is valid. In general, at 314, the token server 130 determines whether the token 14 is valid or not. In this process, the token server 130 may compare the token 104 (received from the user device 120) with each of tokens 104 that are previously programmed into products 122 (at 218 of FIG. 2) and received in message 226 (see FIG. 2) from the remote server 150.

If the token server 130 determines that the token 104 (received from the user device 120) is among the tokens 104 that are previously programmed into products 122, and that the serial number 124 of the product 122 matches the serial number 124 of a product 122 that was previously programmed with the token 104, the token server 130 determines that the token 104 is valid. In other words, if the token server 130 determines that the token 104 (received from the user device 120) matches the token 104 that the product 122 previously programmed with, and that the token 104 is among the registered tokens 104 (received in the report file 222 (see FIG. 2)), the token server 130 determines that the token 104 is valid. Otherwise, the token server 130 may determine that the token 104 is not valid.

At operation 316, the token server 130 transmits a notification message 318 indicating that the token 104 is valid to the user device 120. In response, it is determined that the product 122 is verified and authenticated.

At operation 320, the product 122 and the user device 120 are paired. By doing so, the product 122 may be associated with the user device 120, such that a secure and trusted communication path may be established between the user device 120 and the product 122. In response, the product 122 may be controlled from the user device 120 via a software application installed on the user device 120. For example, if the product 122 is a thermostat, once paired with the user device 120, the thermostat can be controlled such that the temperature of the thermostat can be increased or decreased from the user device 120. For further pairing and authenticating a token 104, the token server 130 may issue (e.g., assign) a new token 104 to the product 122. This is because each token 104 can only be used and redeemed once. Once a token 104 is redeemed (e.g., used to authenticate a product 122), it can no longer be used. Thus, at 322, the token server 130 issues a new or updated token, collectively referred to herein as a second token 104 for the product 122 for the next time authenticating the product 122 is requested.

At operation 324, the token server 130 transmits the second token 104 to the user device 120. The user device 120 receives the second token 104. At operation 326, the user device 120 transmits the second token 104 to the product 122 via a wired and/or wireless communication path. The product 122 stores the second token 104 in its memory. In certain embodiments, the second token 104 replaces the initial token 104. Thus, the life cycle of the initial token 104 may end here.

The second token 104 may be used to authenticate the product 122 the next time authenticating the product 122 is requested. The second token 104 may also be validated by the token server 130 the next time authenticating the product 122 is requested, similar to that described above in FIG. 3 with respect to the initial token 104. This cycle may repeat every time authenticating the product 122 is requested.

Operational Flow for Destroying Disregarded Tokens

Figure 4:
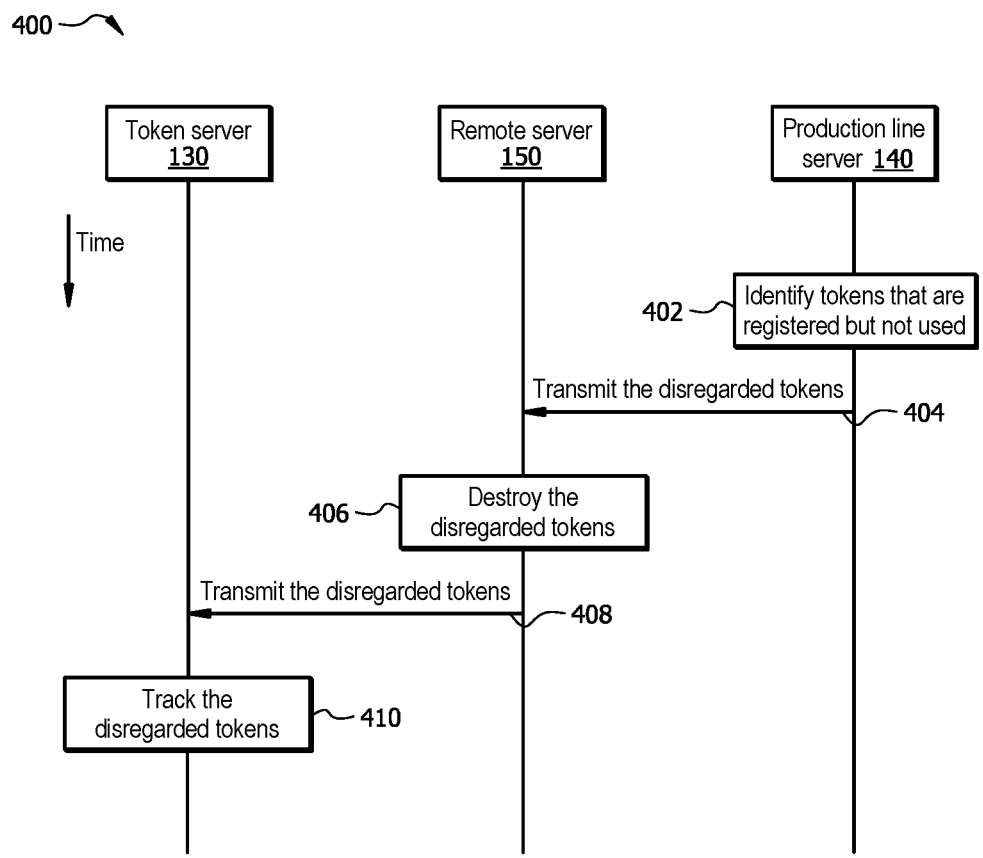
FIG. 4 illustrates an example operational flow of the system of FIG. 1 for detecting and destroying disregarded software tokens.

FIG. 4 illustrates an example operational flow 400 of system 100 (see FIG. 1) for destroying disregarded tokens 104. Modifications, additions, or omissions may be made to the operational flow 400. The operational flow 400 may include more, fewer, or other operations. For example, operations may be performed in parallel or in any suitable order.

At operation 402, the production line server 140 identifies tokens 104 that are provided to the production line server 140 but not used. In other words, the production line server 140 identifies unused tokens 104 that are not programmed into the products 122 (and won't be programmed into the products 122). For example, a token 104 may be not used or not programmed into a product 122 if there is no product 122 available in the current production line, a new model of products 122 is introduced and the new model does not accept the previous version of token 104 (e.g., the token 104 is not compatible with the new model of the product 122), and/or any other reason that causes the token 104 to be incompatible with the product 122. These tokens 104 may be referred to herein as disregarded tokens 104.

At operation 404, the production line server 140 transmits the disregard tokens 104 to the remote server 150. At operation 406, the remote server 150 destroys the disregarded tokens 104. In this process, the remote server 150 may mark the disregarded tokens 104 as disregarded or unused.

At operation 408, the remote server 150 transmits the disregarded tokens 104 to the token server 130. At operation 410, the token server 130 tracks and monitors the disregarded tokens 104 so that the disregarded tokens 104 cannot be used again. One advantage of this process is that if a disregarded token 104 is leaked and used in a counterfeit product, the remote server 150 is able to detect that the disregarded token 104 is not valid and that the product is a counterfeit.

Figure 5:
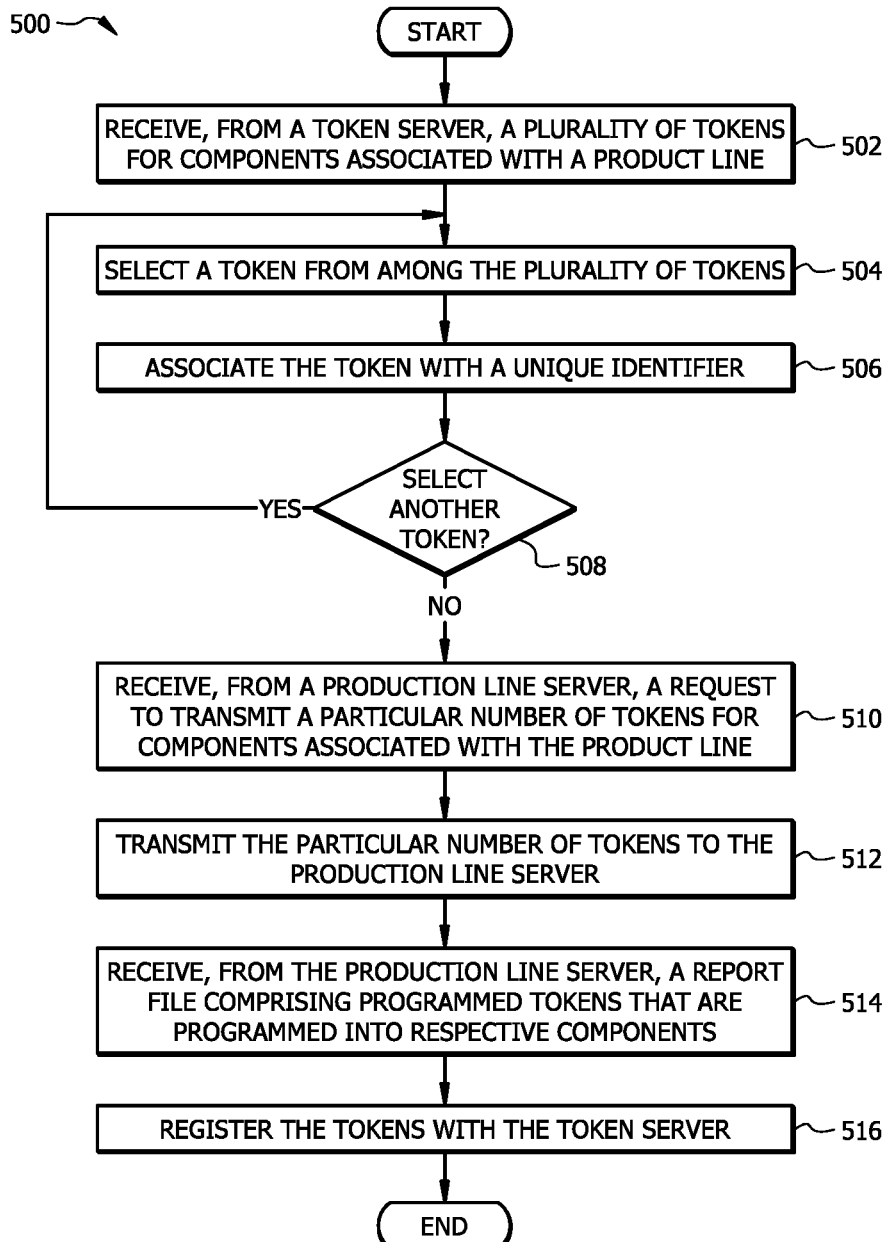
FIG. 5 illustrates an example flowchart of a method for authenticating and verifying products using software tokens.

Example Method for Authenticating and Validating a Product Using a Software Token FIG. 5 illustrates an example flowchart of a method 500 for authenticating and validating a product 122 using a software token 104. Modifications, additions, or omissions may be made to method 500. Method 500 may include more, fewer, or other operations. For example, operations may be performed in parallel or in any suitable order. While at times discussed as the system 100, token server 130, production line server 140, remote server 150, or components of any of thereof performing operations, any suitable system or components of the system may perform one or more operations of the method 500. For example, one or more operations of method 500 may be implemented, at least in part, in the form of software instructions 158 of FIG. 1, stored on non-transitory, tangible, machine-readable media (e.g., memory 156 of FIG. 1) that when run by one or more processors (e.g., processor 152 of FIG. 1) may cause the one or more processors to perform operations 502-516.

At operation 502, the remote server 150 receives, from the token server 130, a plurality of tokens 104 for components 122 associated with a product line. For example, the remote server 150 may transmit a request 204 to the token server 130 to provide the plurality of tokens 104 for components 122 associated with the product line, similar to that described in FIG. 2. The plurality of tokens 104 may be any suitable number, e.g., 1000, 1500, etc. In response, the token server 130 may transmit the requested number of tokens 104 to the remote server 150, similar to that described in FIG. 2.

At operation 504, the remote server 150 selects a token 104 from among the plurality of tokens 104. The remote server 150 may iteratively select a token 104 from among the plurality of tokens 104 until no token 104 is left for evaluation.

At operation 506, the remote server 150 associates the token 104 with a unique identifier 106. The unique identifier 106 may be used to identify and verify the token 104.

At operation 508, the remote server 150 determines whether to select another token 104. The remote server 150 may determine to select another token 104 if at least one token 104 is left for evaluation. If the remote server 150 determines to select another token 104, method 500 returns to 504. Otherwise, method 500 proceeds to 510.

At operation 510, the remote server 150 receives, from the production line server 140, a request to transmit a particular number of tokens 104 for components 122 associated with the product line. For example, the remote server 150 may receive the request message 214 from the production line server 140 similar to that described in FIG. 2.

At operation 512, the remote server 150 transmits the particular number of tokens 104 to the production line server 140. The production line server 140 may proceed with programming the products 122 with the received tokens 104 (one at a time), similar to that described in FIG. 2.

At operation 514, the remote server 150 receives, from the production line server 140, a report file 222 comprising the programmed tokens 104 that are programmed into the respective components 122. The report file 222 may include the programmed tokens 104 each associated with a respective serial number 124 of the product 122 that is programmed with the token 104, and the respective unique identifier 106 of the token 104. The programmed token 104 may be referred to as a token 104 stored in a memory 176 associated with a product 122.

At operation 516, the remote server 150 registers the tokens 104 with the token server 130. In this process, the remote server 150 may transmit a message 226 indicating the programmed tokens 104 each associated with a respective serial number 124 of the product 122 that is programmed with the token 104, and the respective unique identifier 106 of the token 104, similar to that described in FIG. 2. Thus, the inquiries about the tokens 104 are tracked and monitored by the token server 130, similar to that described in FIG. 2.

Operational Flow for Assigning Tokens to Products for Each Product Line

Figure 6:
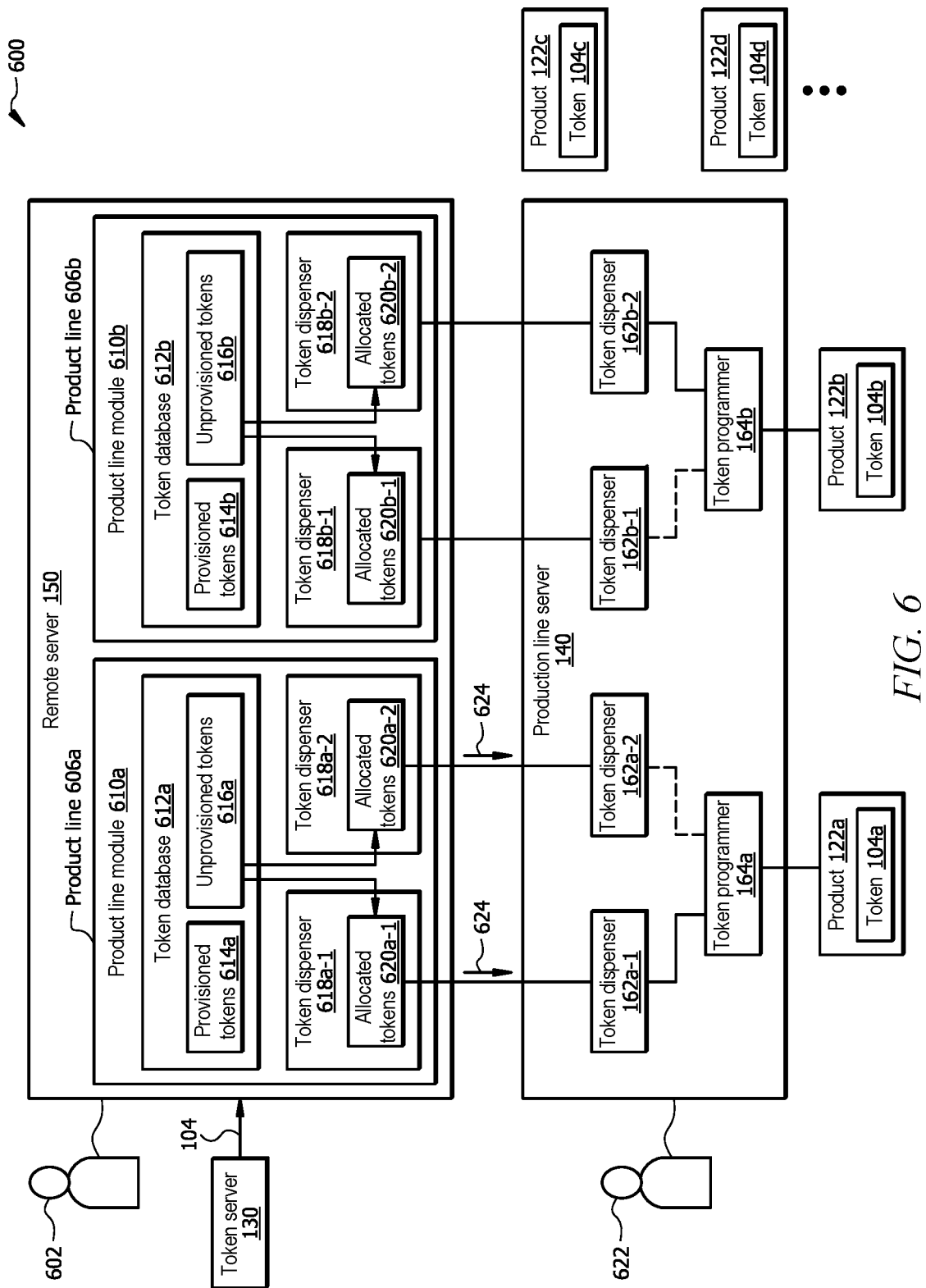
FIG. 6 illustrates an example operational flow of the system of FIG. 1 for assigning tokens to products associated with various product lines.

FIG. 6 illustrates an example operational flow 600 for assigning tokens 104 to products 122 associated with various product lines 606. Modifications, additions, or omissions may be made to the operational flow 600. The operational flow 600 may include more, fewer, or other operations. For example, operations may be performed in parallel or in any suitable order. FIG. 6 further illustrates an embodiment of the remote server 150 and an embodiment of the production line server 140.

In the illustrated embodiment, the remote server 150 includes a product line modules 610a and 610b. Each of the product line modules 610a and 610b is an instance of the product line module 610 described in FIG. 1. The product line module 610a is associated with the product line 606a. The product line module 610b is associated with the product line 606b.

The product line module 601a includes a token database 612a and one or more token dispensers 618a. Although two token dispensers 618a-1 and 618a-2 are shown in FIG. 6, it is understood that the product line module 610a may include any number of token dispensers 618a.

Each of the token databases 612a and 612b is an instance of a token database 612, as described in FIG. 1. The token database 612a stores provisioned tokens 614a and un-provisioned tokens 616a. The provisioned tokens 614a may include tokens 104 that are programmed into products 122 associated with the product line 606a. For example, when a token 104 is programmed into a product 122 associated with the product line 606a (e.g., as described in FIG. 2), it is communicated to the remote server 150 in a report file 222 (see FIG. 2). The remote server 150 may store the programmed token 104 in the token database 612a as a provisioned token 614a. The un-provisioned tokens 616a may include tokens 104 that are not yet programmed in products 122 associated with the product line 606a. For example, when the remote server 150 receives a token 104 for the product line 606a from the token server 130, the remote server 150 associates token 104 with a unique identifier 106 and stores it as an un-provisioned token 616a in the token database 612a.

Each of the token dispensers 618a-1, 618a-2, 618b-1, 618b-2 is an instance of a token dispenser 618, similar to that described in FIG. 1. The token dispenser 618a-1 stores allocated tokens 620a-1. The token dispenser 618a-2 stores allocated tokens 620a-2. When the remote server 150 receives a request to provide tokens 104 for the product line 606a from the production line server 140, it retrieves the requested number of tokens 104 from the un-provisioned tokens 616a and delivers them to the token dispensers 618a-1 and 618a-2.

The product line module 601b includes a token database 612b and one or more token dispensers 618b. Although two token dispensers 618b-1 and 618b-2 are shown in FIG. 6, it is understood that the product line module 610b may include any number of token dispensers 618b.

The token database 612b stores provisioned tokens 614b and un-provisioned tokens 616b. The provisioned tokens 614b may include tokens 104 that are programmed into products 122 associated with the product line 606b. For example, when a token 104 is programmed into a product 122 associated with the product line 606b (e.g., as described in FIG. 2), it is communicated to the remote server 150 in a report file 222 (see FIG. 2). The remote server 150 may store the programmed token 104 in the token database 612b as a provisioned token 614b. The un-provisioned tokens 616b may include tokens 104 that are not yet programmed in products 122 associated with the product line 606b. For example, when the remote server 150 receives a token 104 for the product line 606b from the token server 130, the remote server 150 associates token 104 with a unique identifier 106 and stores it as an un-provisioned token 616b in the token database 612b.

The token dispenser 618b-1 stores allocated tokens 620b-1. The token dispenser 618b-2 stores allocated tokens 620b-2. When the remote server 150 receives a request to provide tokens 104 for the product line 606b from the production line server 140, it retrieves the requested number of tokens 104 from the un-provisioned tokens 616b and delivers them to the token dispensers 618b-1 and 618b-2.

The operational flow 600 may begin when the administrator 602 operating the remote server 150 sends a request indicating to open an account with the token server 130 for a product line 606. The product line 606 may indicate a particular line of products 122 to be manufactured and programmed with tokens. The product line 606 may be associated with a unique account number that identifies the product line 606. For example, in the illustrated example, the administrator 602 may send a request to open an account for product line 606a. The request may include information about the product line 606a, including one or more types of products 122 associated with the product line 606a, etc. In response, the token server 130 may open the new account for the product line 606a. Similarly, the administrator 602 may send a second request to open an account for product line 606b, and in response, the token server 130 may open a new account for the product line 606b. The corresponding description below describes operations of the remote server 150 with respect to the product line 606a. However, it is understood that similar operations may be performed for the product line 606b.

The remote server 150 (e.g., via the product line module 610a) establishes a secure communication path between the product line module 610a and the token server 130, e.g., to receive the tokens 104. The remote server 150 (e.g., via the product line module 610a) also establishes secure communication paths between the token database 612a and token dispensers 618a-1 and 618a-2.

The remote server 150 (e.g., via the product line module 610a) sends a request to receive a particular number of tokens 104 for the product line 606a to the token server 130, such as the request 204 described in FIG. 2. In response, the token server 130 transmits the requested number of tokens 104 for the product line 606a to the remote server 150.

The remote server 150 associates each token 104 with a unique identifier 106, similar to that described in FIG. 2. The product line module 610a stores the tokens 104 (associated with the unique identifiers 106) in the token database 612a as un-provisioned tokens 616a.

Receiving a Request to Assign Tokens for a Product Line

An administrator 622 operating the production line server 140 may initiate a request to receive a particular number of tokens 104 for a product line 606a from the remote server 150. The remote server 150 (e.g., via the token dispensers 618a-1 and 618a-2) queries the token database 612a for the particular number of un-provisioned tokens 616a. The token dispensers 618a-1 and 618a-2 receive the requested number of un-provisioned tokens 616a.

The remote server 150 (e.g., via the token dispensers 618a-1 and 618a-2) may add a request identifier (ID) associated with the request in a text field associated with the received un-provisioned tokens 616a. The token dispenser 618a-1 receives allocated tokens 620a-1. The allocated tokens 620a-1 may include a number of un-provisioned tokens 616a that the token dispenser 618a-1 receives. The allocated tokens 620a-1 are allocated to the request ID and product line 606a.

The token dispenser 618a-2 receives allocated tokens 620a-2. The allocated tokens 620a-2 may include a number of un-provisioned tokens 616a that the token dispenser 618a-2 receives. The allocated tokens 620a-2 are allocated to the request ID and product line 606a. The sum of the allocated tokens 620a-1 and 620a-2 is the total number of received un-provisioned tokens 616a. For example half of the requested number of tokens 104 from the un-provisioned tokens 616a may be stored in the token dispenser 618a-1, and the other half in the token dispenser 618a-2.

Communicating Tokens Even in Poor Wireless Communication Conditions

Now that the token dispensers 618a-1 and 618a-2 have the allocated tokens 620a-1 and 620b-2, they send an acknowledgment message to the token dispensers 162a-1 and 162a-2 that they have the requested number of tokens 104 for products 122 associated with the product line 606a.

For example, the token dispenser 618a-1 sends the acknowledgment message to the token dispenser 162a-1, and the token dispenser 618a-2 sends the acknowledgment message to the token dispenser 162a-2. The token dispensers 162a-1 and 162a-2 send a reply message indicating that they are ready to receive the tokens for the request ID and product line 606a to the token dispensers 618a-1 and 618a-2, respectively.

The remote server 150 (e.g., via the token dispensers 618a-1 and 618a-2) prepares a file 624 that includes the requested number of token 104 to the sent to the production line server 140 (from one or more of the allocated tokens 620a-1 and 620a-2).

The remote server 150 determines the communication channel reliability between the remote server 150 and the production line server 140. The remote server 150 determines whether the wireless communication channel between the remote server 150 and the production line server 140 is reliable to be able to transmit the file 624 to the production line server 140.

For example, if the remote server 150 determines that the wireless communication channel reliability between the remote server 150 and the production line server 140 is less than a threshold percentage (e.g., less than 60%, 50%, etc.), the remote server 150 may determine that the communication channel between the remote server 150 and the production line server 140 is not reliable. In response, the remote server 150 may transmit the file 624 in batches. In this process, the remote server 150 may divide the file 624 into multiple batches (e.g., batch files). The remote server 150 (via the token dispensers 618a-1 and 618a-2) may then transmit each batch file one at time to the production line server 140 until all the requested number of tokens 104 are received at the token dispensers 162a-1 and 162a-2.

The size of each batch file may depend on the size of the file 624 and the communication path speed between the remote server 150 and the production line server 140. For example, the size of each batch file may be proportional to the communication path speed, such that as the communication path speed reduces, the size of each batch file also reduces, and the number of batch files increases.

In certain embodiments, the remote server 150 may determine the wireless communication channel between the remote server 150 and the production line server 140 based on the wireless communication speed between the remote server 150 and the production line server 140.

For example, if the wireless communication speed between the remote server 150 and the production line server 140 is less than a threshold speed (e.g., less than 10 kilobyte per second (kbps), 12 kbps, etc.), the remote server 150 may determine that the wireless communication channel reliability between the remote server 150 and the production line server 140 is less than a threshold percentage (e.g., less than 60%, 50%, etc.).

For example, if the wireless communication speed between the remote server 150 and the production line server 140 is less than a threshold speed (e.g., less than 10 kbps, 12 kbps, etc.) and the size of the file 624 is large (e.g., 500 (Megabyte) Mb, 600 Mb, etc.), the remote server 150 may determine that the communication channel reliability is not optimal to transfer the file 624 at once, may divide the file 624 into multiple batch files, and transfer each batch file one at a time to the production line server 140. For example, each batch file may be sent in a different communication channel between the remote server 150 and the production line server 140.

One technological advantage of this process is that even in poor wireless communication cases, the remote server 150 is able to provide the requested number of tokens 104 to the production line server 140. Thus, the production rate of the products 122 is not interrupted.

Programming Products with Tokens

The token dispensers 162a-1 and 162a-2 receive the file 624 and the requested number of tokens 104. The token programmer 164 is an instance of token programmer 164 described in FIG. 1. The token programmer 164a sends a query message to the token dispensers 162a-1 and 162a-2 to query whether they have tokens 104 for products 122 for the product line 606a.

In the illustrated example, each of token dispensers 162a-1 and 162a-2 sends an acknowledgment message indicating that it has tokens 104 for products 122 for the product line 606a. The token programmer 164a chooses one of the token dispensers 162a-1 and 162a-2 to receive tokens 104 from, one token 104 at a time. The token programmer 164a may choose one of the token dispensers 162a-1 and 162a-2 randomly. In the illustrated example, the token programmer 164a chooses the token dispenser 162a-1 and receives one token 104 at a time to program the products 122 associated with the product line 606a (as indicated by the solid line between the token programmer 164a and the token dispenser 162a-1).

The token programmer 164a may choose a token dispenser 162a that has tokens 104 for the products 122 associated with the product line 606a. For example, the token programmer 164a receives a first token 104a from the token dispenser 162a-1 (as indicated by a solid line between the token programmer 164a and the token dispenser 162a-1). The token programmer 164a programs the product 122a with the first token 104a.

The token programmer 164a may request to receive a second token 104 to program a second product 122 associated with the product line 606a from the token dispenser 162a-1. This process may continue as long as the token programmer 164a requests to receive a token 104 for programming a product 122 associated with the product line 606a, and the token dispenser 162a-1 has at least one token 104.

The remote server 150 and the production line server 140 may perform a similar operation for products 122 associated with the product line 606b. For example, when the token dispensers 162b-1 and 162b-2 acknowledge that they have tokens 104 ready to be programmed into products 122 associated with the product line 606b (i.e., allocated tokens 620b-1 and 620b-2), a communication channel may be established between the token dispenser 618b-1 and token dispenser 162b-1, and the token dispenser 618b-b and token dispenser 162b-b.

The token dispensers 162b-1 and 162b-2 may receive the requested number of tokens 104 for the product line 606b from token dispensers 618b-1 and 618b-2, respectively. The token programmer 164b chooses one of the token dispensers 162b-1 and 162b-2 to receive tokens 104 from, e.g., randomly. In the illustrated example, the token programmer 164b chooses the token dispenser 162b-2 and receives one token 104 at a time to program the products 122 associated with the product line 606b (as indicated by the solid line between the token programmer 164b and the token dispenser 162b-2). The token programmer 164b receives the first token 104b for the product 122b, and programs the product 122b with the first token 104b.

The result of the operational flow 600 may be that each product 122 is programmed with a unique token 104. For example, the product 122*c* is programmed with token 104*c*, and product 122*d* is programmed with token 104*d*. Each of the products 122*c* and 122*d* may be associated with one of the product lines 606.

The tokens 104 for different product lines 606*a* and 606*b* do not overlap. The remote server 150 and the token server 130 keep track of which token 104 is used, assigned, and programmed into which product 122 associated with a product line 606.

In certain embodiments, the token dispensers 162*a*-1 and 162*a*-2 may maintain a number of tokens 104 to be able to provide to the token programmer 164*a*.

For example, if the number of the tokens 104 at the token dispenser 162*a*-1 becomes lower than a threshold number or a threshold percentage of full capacity (e.g., less than 70%, etc.), the token dispenser 162*a*-1 may request the remote server 150 to provide more tokens 104 until the number of tokens 104 at the token dispenser 162*a*-1 is at full capacity, as defined in the rules 160.

Determining Whether a Token Dispenser is Authorized to Receive Tokens

In certain embodiments, the token dispenser 162*a*-1 initiates a request to receive tokens 104 to the remote server 150. The request may include the product line 606*a*, number of token 104, etc.

The remote server 150 determines the authentication of the token dispenser 162*a*-1 to receive tokens 104 for the product line 606*a* and whether the token dispenser 162*a*-1 is authenticated to receive the requested number of tokens 104. If the remote server 150 determines that the token dispenser 162*a*-1 is not authorized to receive tokens 104 for the product line 606*a*, the remote server 150 may issue an error message to the administrator 602.

If the remote server 150 determines that the token dispenser 162*a*-1 is authorized, the remote server 150 determines whether the remote server 150 has enough tokens 104 (e.g., in the un-provisioned tokens 616*a*) to fulfill the number of tokens 104 requested by the token dispenser 162*a*-1. In this process, the remote server 150 determines the number of tokens 104 in the un-provisioned tokens 616*a*. If the remote server 150 does not have enough tokens 104 to fulfill the request, the remote server 150 sends an insufficient token message to the token dispenser 162*a*-1. The remote server 150 may also send a message indicating to query later in a particular time duration (e.g., one week later, one day later, etc.) to the token dispenser 162*a*-1.

The token dispenser 162*a*-1 may request to receive tokens 104 after the particular time duration from the remote server 150. The token dispenser 162*a*-1 may request to top off the number of tokens 104 it received so that the number of available tokens 104 at the token dispenser 162*a*-1 does not reduce to less than a threshold percentage of full capacity (e.g., less than 70%, 60%, etc.) as defined by the rules 160.

The token dispenser 162*a*-1 may expect to receive reporting of tokens 104 from the remote server 150 periodically (e.g., every day, every week, etc.). If the token dispenser 162*a*-1 does not receive a report of tokens 104 on time, the token dispenser 162*a*-1 may send an error message indicating that the reporting is overdue as defined by the rules 160.

Service Discovery Between the Token Dispensers and the Token Programmers

The service discovery may be referred to as a token dispenser 618 at the remote server 150 servicing a token dispenser 162 at the production line server 140 by providing tokens 104. The token programmer 164*a* sends a request to the token dispensers 162*a*-1 and 612*a*-2 to determine whether they have tokens 104 for product line 606*a*. Both token dispensers 162*a*-1 and 162*a*-2 may respond that they can provide tokens 104 for the product line 606*a*. The token programmer 164*a* may choose one of the token dispensers 162*a*-1 and 162*a*-2 to receive tokens 104 from. For example, the token programmer 164*a* may choose the token dispenser 162*a*-1.

In response, a dispensing session is established between the token programmer 164*a* and the token dispenser 162*a*-1 (as illustrated by a solid line between the token programmer 164*a* and the token dispenser 162*a*-1). During the dispensing session, the token programmer 164*a* receives one token 104 at a time from the token dispenser 162*a*-1. If the dispensing session is interrupted, the token programmer 164*a* may switch to the token dispenser 162*a*-2 to receive tokens 104 from. The dispensing session may be interrupted, for example, due to poor wireless communication conditions, the token dispenser 162*a*-1 going offline, and the like.

Alternatively, if only one of the token dispensers 162*a*-1 and 162*a*-2 (e.g., token dispenser 162*a*-1) responds that it has tokens 104 for the product line 606*a*, the token programmer 164*a* may select the token dispenser 162*a*-1 to receive tokens 104 from.

The response indicating that the token dispenser 162*a*-1 has available tokens 104 may be associated with a time-to-live parameter. The time-to-live parameter may indicate the amount of time that the response is viable. A Domain Service Name (DNS) governs the service discovery refresh. Thus, the token programmer 164*a* may update its DNS cache according to the time-to-live parameter disclosed by the token dispensers 162*a*-1. The same applies to other token dispensers 162. For example, assume that the time-to-live parameter is five minutes, and the token programmer 164*a* requests which of the token dispensers 162*a*-1 and 162*a*-2 have available tokens 104. If the token programmer 164*a* wants to receive tokens 104 after five minutes from the first request, it has to send another request to the token dispensers 162*a*-1 and 162*a*-2.

When the token programmer 164*a* finishes the process of programming products 122 with tokens 104, it may send a final message to the token dispenser 162*a*-1 to close the dispensing session between the token programmer 164*a* and the token dispenser 162*a*-1.

Similarly, the token programmer 164*b* sends a request to the token dispenser 162*b*-1 and 612*b*-2 to determine whether they have tokens 104 for product line 606*b*. Both token dispensers 162*b*-1 and 162*b*-2 may respond that they can provide tokens 104 for the product line 606*b*.

The token programmer 164*b* may choose one of the token dispensers 162*b*-1 and 162*b*-2 to receive tokens 104 from. For example, the token programmer 164*b* may choose the token dispenser 162*b*-2 (as illustrated by a solid line between the token programmer 164*b* and the token dispenser 162*b*-2). In response, a dispensing session is established between the token programmer 164*b* and the token dispenser 162*b*-2. During the dispensing session, the token programmer 164*b* receives one token 104 at a time from the token dispenser 162*b*-2. If the dispensing session is interrupted, the token programmer 164*b* may switch to the token dispenser 162*b*-1 to receive tokens 104 from. The dispensing session may be interrupted, for example, due to poor wireless communication conditions, the token dispenser 162*b*-2 going offline, and the like.

Alternatively, if only one of the token dispensers 162*b*-1 and 162*b*-2 (e.g., token dispenser 162*b*-2) responds that it has tokens 104 for the product line 606*b*, the token programmer 164*b* may select the token dispenser 162*b*-2 to receive tokens 104 from.

Operational Flow for Reporting Programmed Tokens

Figure 7:
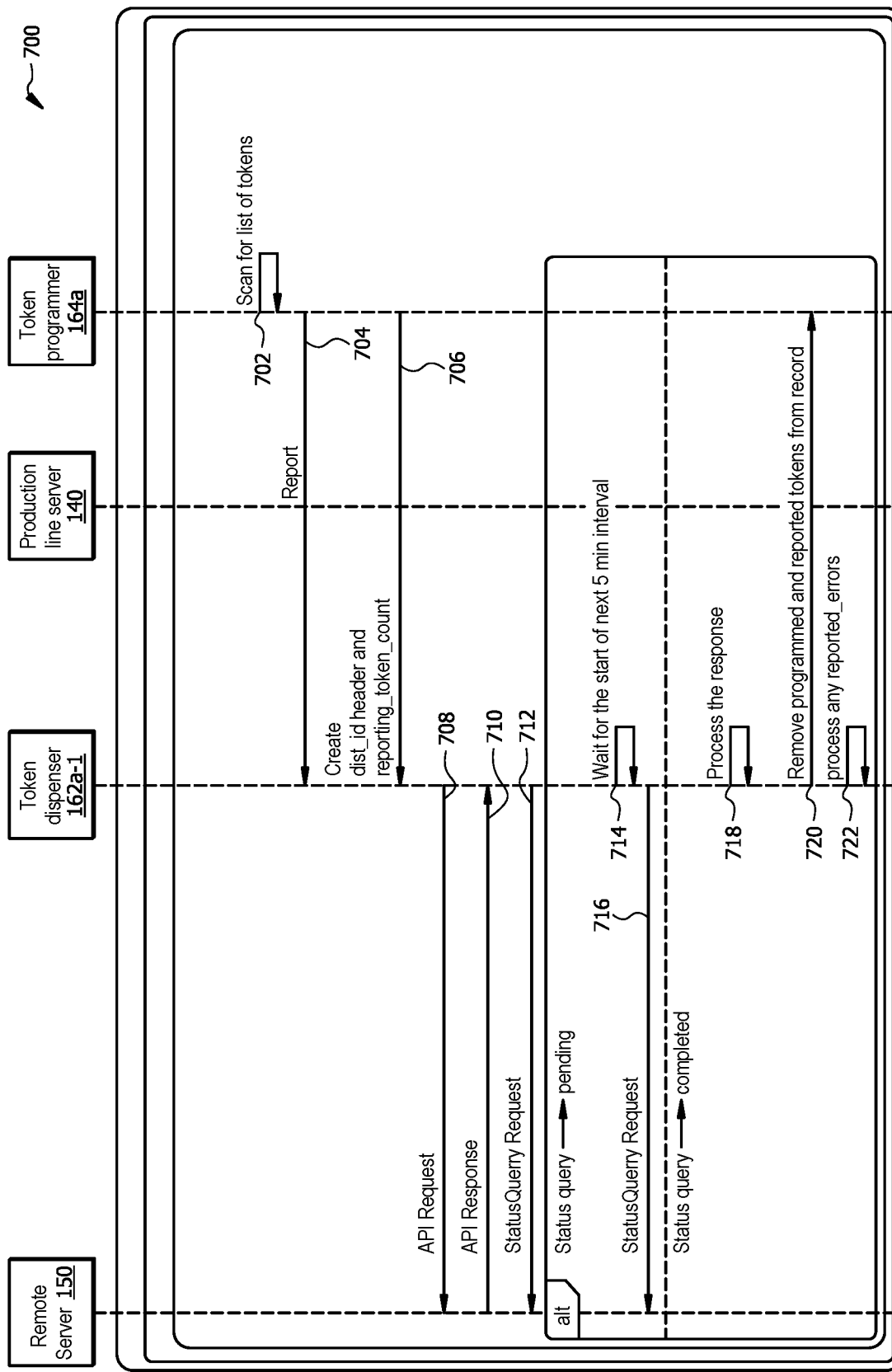
FIG. 7 illustrates an example operational flow of the system of FIG. 1 for reporting tokens that are programmed into products.

FIG. 7 illustrates an example operational flow 700 of system 100 of FIG. 1 for reporting the programmed tokens 104. Modifications, additions, or omissions may be made to the operational flow 700. The operational flow 700 may include more, fewer, or other operations. For example, operations may be performed in parallel or in any suitable order.

At operation 702, the token programmer 164a may scan a list of tokens 104 that are programmed into the products 122. At operation 704, the token programmer 164a sends the list of programmed tokens 104 and the serial numbers 124 of programmed products 122 to the token dispenser 162a-1.

At operation 706, the token dispenser 162a-1 creates a header with the distribution ID, reported programmed tokens 104, and serial numbers 124. At operation 708, the token dispenser 162a-1 sends the header with the list of programmed tokens 104, serial numbers 124, and token IDs to the remote server 150. For example, the token dispenser 162a-1 may send an API request (e.g., programmedReportRequest (TokenProgrammedReportRequest) to the remote server 150. The request indicates to update the list of programmed tokens 104 (e.g., the provisioned tokens 614a) based on the provided information. The remote server 150 verifies whether the provided information is accurate, e.g., there are no duplicate tokens 104.

At operation 710, the remote server 150 sends an API response confirming the request ID associated with the programmed tokens 104. For example, the remote server 150 may send an API response indicating that the provided information is accurate if it determines that there is no issue in the list of programmed tokens 104.

If the remote server 150 does not provide a response, the token dispenser 162a-1 sends a status query indicating whether the list of programmed tokens 104 is accurate at 712. The remote server 150 may send a response indicating that the provided information is accurate if it determines that there is no issue in the list of programmed tokens 104. Otherwise, it may send a response indicating that the provided information is not accurate.

In an alternative case where the token dispenser 162a-1 does not receive the response from the remote server 150 after sending the status query message to the remote server 150 or receives a message that indicates the status is pending, at 714, the token dispenser 162a-1 may start a timer and wait for a response from the remote server 150.

At operation 716, after the timer reaches a preset time duration (e.g., five minutes, ten minutes, etc.), the token dispenser 162a-1 may send another status query request to the remote server 150. This process may continue until the token dispenser 162a-1 receives a response from the remote server 150.

In an alternative case where the remote server 150 has responded to the token dispenser 162a-1 indicating that the status query is completed, at 718, the token dispenser 162a-1 processes the response from the remote server 150. At operation 720, the token dispenser 162a-1 removes the reported tokens from the token programmer 164a. At operation 722, the token dispenser 162a-1 processes any reported errors, e.g., duplicated tokens 104, etc.

Detecting Errors and Failures in Authenticating a Product Using a Software Token In certain embodiments, the components of the system 100 (see FIG. 1) including the remote server 150 and the production line server 140 may be configured to detect errors and failures in the operations of authenticating a product 122 using a software token 104.

For example, in a training process, various failures and errors (e.g., errant requests and errant responses) may be injected into the communication paths between the remote server 150, token server 130, and the production line server 140. For example, an error may include that the remote server 150 submits a request to receive tokens 104 for an incorrect product line ID (e.g., incorrect product line) to the token server 130. In this example, the token server 130 may detect the error, indicate to the remote server 150 that an incorrect product line ID is provided, and correct the error by providing the correct product line ID.

In another example, the remote server 150 may request more than the allowed number of tokens 104 from the token server 130 (according to the rules 160). In this case, the request is rejected. The remote server 150 receives an error message, flags and logs the rejection, and corrects the number of requested tokens 104 according to the rules 160.

In another example, the remote server 150 may request to receive tokens 104 from the token server 130. In response, remote server 150 may receive a message indicating there is insufficient token number and to try again after a particular time duration, e.g., one week, etc. The remote server 150 may try again after the particular time duration and expect not to receive an error or try again message.

In another example, the token server 130 may be offline or down. The remote server 150 may receive a try again message that indicates to try again after the particular time duration. The remote server 150 may start a timer and query again after the particular time duration and expect not to receive an error or try again message.

In another example, if a user enters an incorrect product line ID in the request to receive tokens 104 from the token server 130, the remote server 150 detects that error and corrects the product line ID. In another example, if a filename that includes the tokens 104 is incorrect, the remote server 150 detects and corrects the filename. In another example, if a duplicate token 104 is received from the token server 130, the remote server 150 detects that error and reports to the token server 130. In another example, if a disregarded token 104 is used and programmed into a product 122, the remote server 150 detects that error and reports to the token server 130 and production line server 140.

In another example, if an administrator 622 via production line server 140 requests to receive more than an allowed number of tokens 104 from the remote server 150 (according to the rules 160), the remote server 150 detects that error and requests the production line server 140 to reduce the number of requested tokens according to the rules 160.

In another example, if the production line server 140 requests to receive tokens 104 from the remote server 150 and receives a message that indicates the remote server 150 does not have tokens 104 right now, the production line server 140 may request to receive tokens after a particular time duration, e.g., after one day, one week, etc. The production line server 140 may start a timer and query again after the particular time duration and expect not to receive an error or try again message.

In another example, if the production line server 140 requests to receive tokens 104 from the remote server 150 and does not receive an acknowledgment message or the tokens 104 from the remote server 150, the production line server 140 may periodically (e.g., every day, every week, etc.) send a request to receive tokens 104 until it receives the tokens 104.

In another example, if the administrator 622 via the production line server 140 sends a file with an incorrect filename, an incorrect request ID, a file with missing product line ID, a file with missing token 104, etc. to the remote server 150, the remote server 150 detects that error, reports to the production line server 140, and corrects the error.

In another example, if a token 104 is programmed into a product 122 but the production line server 140 does not send a report file 222 within a threshold time period (e.g., within one day, one week, etc.) to the remote server 150, the remote server 150 may register the programmed tokens 104 with the token server 130 anyway according to the rules 160.

Figure 8:
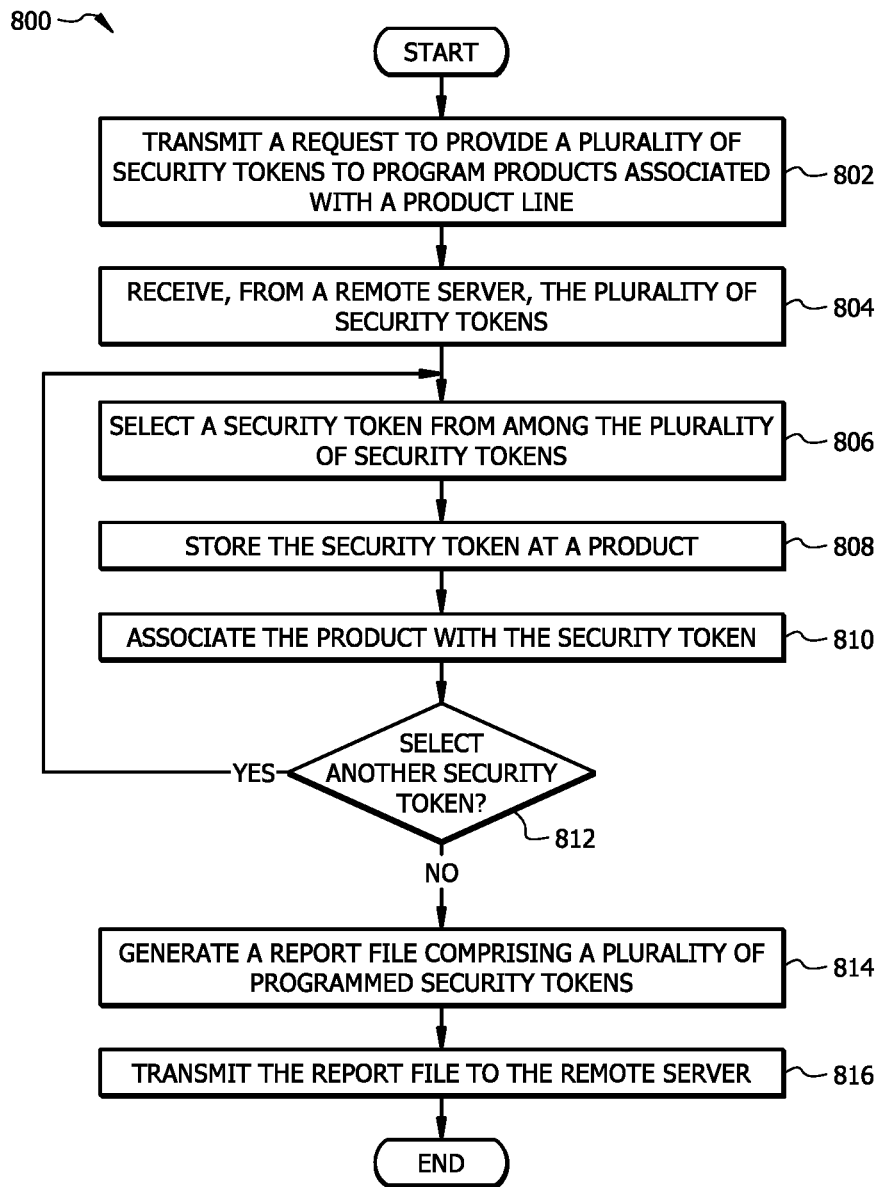
FIG. 8 illustrates an example flowchart of a method for authenticating and verifying products using software tokens from perspective of a production line server.

Example Method for Authenticating and Validating a Product Using a Software Token from a Perspective of a Production Line Server FIG. 8 illustrates an example flowchart of a method 800 for authenticating and validating a product 122 using a software token 104 from a perspective of the production line server 140. Modifications, additions, or omissions may be made to method 800. Method 800 may include more, fewer, or other operations. For example, operations may be performed in parallel or in any suitable order. While at times discussed as the system 100, token server 130, production line server 140, remote server 150, or components of any of thereof performing operations, any suitable system or components of the system may perform one or more operations of the method 800. For example, one or more operations of method 800 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 802-816.

At operation 802, the production line server 140 transmits a request 214 to provide a first plurality of security tokens 104 to program products 122 associated with a product line 606. For example, the production line server 140 may transmit the request 214 to the remote server 150 similar to that described in FIG. 2.

At operation 804, the production line server 140 receives, from the remote server 150, the first plurality of security tokens 104, similar to that described in FIG. 2. At operation 806, the production line server 140 selects a security token 104 from among the plurality of security tokens 104. The production line server 140 may iteratively select a security token 104 from among the plurality of security tokens 104 until no security token 104 is left for evaluation.

At operation 808, the production line server 140 stores the security token 104 at a product 122. In this process, the production line server 140 programs the security token 104 into the product 122, similar to that described in FIG. 2. In certain embodiments, a token dispenser 162 may receive the tokens 104 from the remote server 150 and forward one token 104 at a time to a token programmer 164. The token programmer 164 may program each token 104 with the respective product 122, similar to that described in FIGS. 2 and 6. In certain embodiments, programming each security token 104 from among the plurality of security tokens 104 into the respective product 122 may comprise encoding each product 122 with a respective security token 104 such that the respective security token 104 is retrievable upon request for authenticating a product 122, similar to that described in FIGS. 2-6.

At operation 810, the production line server 140 associates the product 122 with the security token 104. In this process, the production line server 140 may associate the product 122 with the security token 104 such that the respective security token 104 is retrievable upon request for authenticating a product 122, similar to that described in FIGS. 2-6.

At operation 812, the production line server 140 determines whether to select another security token 104. The production line server 140 determines to select another security token 104 if at least one security token 104 is left for evaluation. If the production line server 140 determines to select another security token 104, method 800 returns to operation 806. Otherwise, method 800 proceeds to operation 814.

At operation 814, the production line server 140 generates a report file 222 comprising a plurality of programmed security tokens 104. Each of the tokens 104 that is programmed into a product 122 is included in the report file 222. In certain embodiments, the report file 222 may include serial numbers 124 of the products 122, unique identifiers 106 of the tokens 104, and any other suitable information, similar to that described in FIG. 2.

At operation 816, the production line server 140 transmits the report file 222 to the remote server 150, similar to that described in FIG. 2. In certain embodiments, the remote server 150 is configured to receive, from the token server 130, a second plurality of tokens 104, where the second plurality of tokens 104 is a subset of the first plurality of tokens 104 designated for products 122 associated with the product line 606 described in operation 802. The remote server 150 associates each token 104 with a respective unique identifier, similar to that described in FIG. 2. The remote server 150 receives, from the production line server 140, the request 204. In response, the remote server 150 transmits the first plurality of tokens 104 to the production line server 140. The remote server 150 receives the report file 222 from the production line server 140. The remote server 150 registers the plurality of programmed tokens 104 with the token server 130, similar to that described in FIG. 2.

In certain embodiments, the token server 130 may receive, from the user device 120, a request 312 to authenticate the token 104. This may be in response to the user device 120 querying the product 122 to provide the token 104, receiving, from the product 122, the token 104, the unique identifier 106 associated with the token 104, and the serial number 124 associated with the product 122, and transmitting the token 104, the unique identifier 106, and the serial number 124 to the token server 130.

The token server 130 may determine whether the token 104 is valid or not based on the token 104, the unique identifier 106, and the serial number. In response to determining that the token 104 is valid, the token server 130 may transmit a message 318 indicating that the token 104 is valid to the user device 120. In response to the message 318, the product 122 is authenticated, similar to that described in FIG. 3. The token server 130 may communicate, to the user device 120, a second token 104 to be used for a next time that authentication of the product 122 is requested.

In certain embodiments, the production line server 140 may be further configured to, for each product 122 from the products 122, fetch a serial number 124 associated with the product 122 from the product 122, associated the programmed token 104 to the serial number 124, and add the serial numbers 124 to the report file 222.

In certain embodiments, the production line server 140 may be further configured to determine at least one unused token 104 that is not and will not be programmed into a product 122 and transmit the at least one unused token 104 to the remote server 150, similar to that described in FIG. 4.

The remote server 150 may tag the at least one unused token 104 as at least one disregarded token 104 and transmit the at least one disregarded token 104 to the token server 130 such that the at least one disregarded token 104 is tracked and cannot be used again, similar to that described in FIG. 4.

In certain embodiments, the production line server 140 may be further configured to determine whether the wireless communication channel reliability between the production line server 140 and the remote server 150 is more than or less than a threshold percentage. In certain embodiments, transmitting the report file 222 to the remote server 150 may include dividing the report file 222 into batches and transmitting each batch one a time to the remote server 150, similar to that described in FIG. 4.

Example Method for a Product that Utilizes a Security Token

Figure 9:
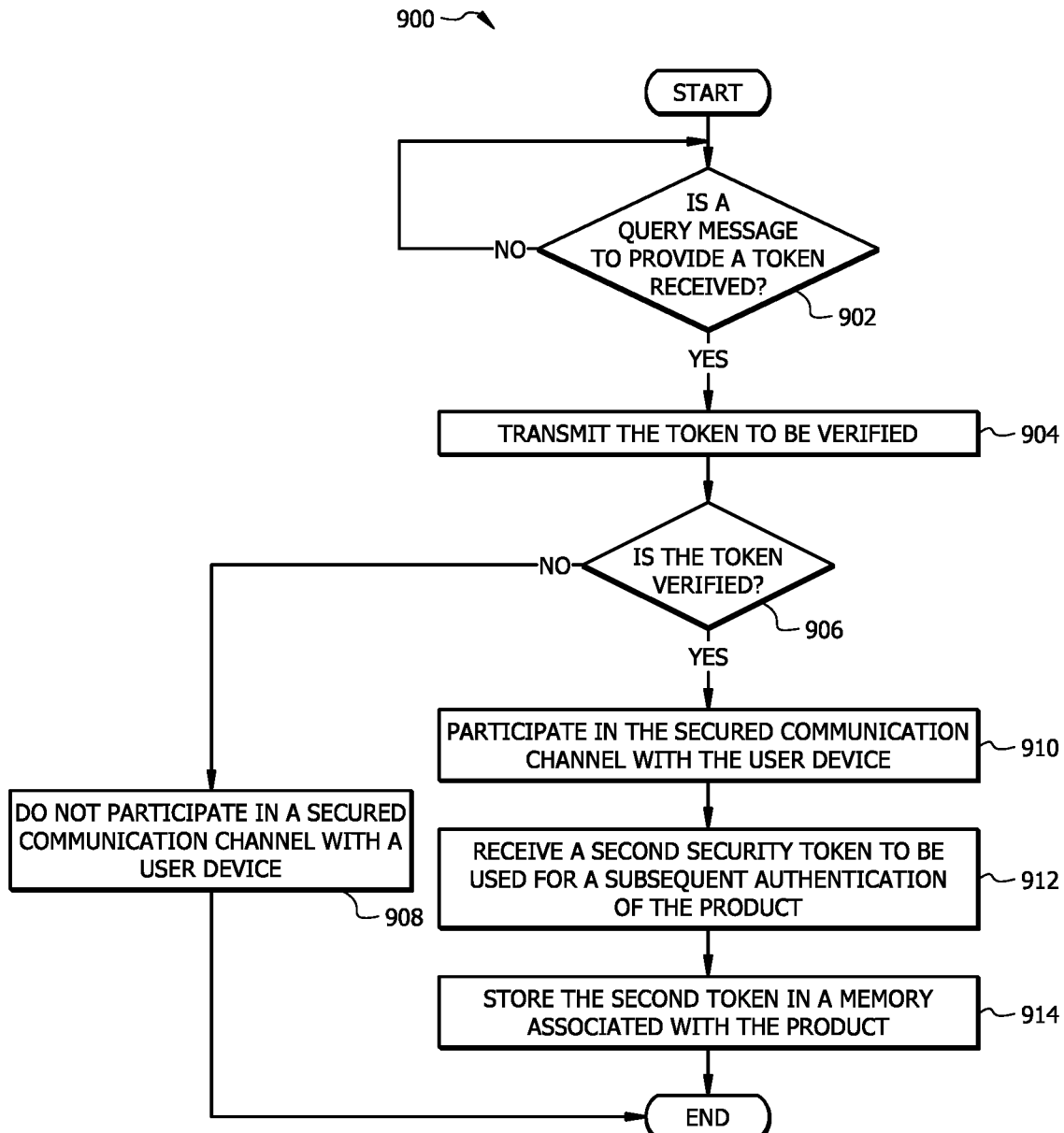
FIG. 9 illustrates an example flowchart of a method for a product that utilizes a security token.

FIG. 9 illustrates an example flowchart of a method 900 for a product 122 that utilizes a security token 104. Modifications, additions, or omissions may be made to method 900. Method 900 may include more, fewer, or other operations. For example, operations may be performed in parallel or in any suitable order. While at times discussed as the system 100, token server 130, production line server 140, remote server 150, or components of any of thereof performing operations, any suitable system or components of the system may perform one or more operations of the method 900. For example, one or more operations of method 900 may be implemented, at least in part, in the form of software instructions 178 of FIG. 1, stored on non-transitory, tangible, machine-readable media (e.g., memory 176 of FIG. 1) that when run by one or more processors (e.g., processor 172 of FIG. 1) may cause the one or more processors to perform operations 902-914.

At operation 902, the product 122 determines whether a query message 304 to provide a token 104 is received. If the product 122 determines that the query message 304 is received from the user device 120, method 900 proceeds to operation 904. Otherwise, method 900 remains at operation 902 until a query message 304 is received by the product 122. In method 900, it is assumed that the product 122 is already programmed with the security token 104, i.e., the security token 104 is stored in the memory 176, such that the security token 104 is retrievable upon receiving the query message to provide the token 104 for verification of the token 104 and the product 122.

At operation 904, the product 122 transmits the security token 104 to be verified. For example, the product 122 transmits the security token 104 to the user device 120. The token 104 is then transmitted to the token server 130 so that the token 104 is verified, similar to that described in FIGS. 2-7.

At operation 906, it is determined whether the token 104 is verified. In certain embodiments, the token server 130 may determine whether the token 104 is verified, similar to that described in FIG. 3. If it is determined that the token 104 is verified, method 900 proceeds to operation 910. Otherwise, method 900 proceeds to operation 908. At operation 908, the product 122 does not participate in a secured communication channel with the user device 120.

At operation 910, the product 122 participates in a secured communication channel with the user device 120. For example, in response to the token 104 being verified, the product 122 is authenticated (e.g., it is determined that the product 122 is not a counterfeit product). When the product 122 is authenticated, a secured communication channel is established between the product 122 and the user device 120 such that the apparatus 12 is controllable by the user device 120. In other words, the product 122 is paired with the user device 120.

At operation 912, the product 122 receives a second security token 104 to be used for a subsequent authentication of the product 122. The second token 104 is issued by the token server 130 for a next time authentication of the product 122 is requested, similar to that described in FIG. 3.

At operation 914, the product 122 stores the second security token 104 in the memory 176 associated with the product 122. In certain embodiments, the second token 104 may replace with the initial token 104. In certain embodiments, the initial token 104 may be deleted. In certain embodiments, the initial token 104 may be reported to the token server 130, production line server 140 and/or the remote server 150 to be tagged as a used token 104 so it is not used again.

In certain embodiments, method 900 may continue in a loop. For example, after any of the operations 914 and 908, method 900 may return to operation 902. Thus, method 900 may be performed every time a query message 304 (or subsequent query messages 304) to provide a token 104 is (or are) received by the product 122. For example, in a subsequent authentication operation of the product 122, if it is determined that a token 104 is verified at operation 906, the product 122 may participate in a secured communication channel with the user device 120, receive a new token 104 to be used for a subsequent authentication of the product 122, and store the new token 104 in the memory 176. Otherwise, the product 122 may not participate in the secured communication with the user device 120.

In certain embodiments, the product 122 may be associated with a serial number 124. When the token 104 is programmed into the product 122 (i.e., stored in the memory 176), the serial number 124 may be associated with the security token 104. In certain embodiments, the security token 104 may be determined to be valid when the serial number 124 corresponds to or matches an expected serial number 124 associated with the security token 104.

In certain embodiments, the security token 104 may be associated with a unique identifier 106. In certain embodiments, when the security token 104 is programmed into the product 122 (i.e., stored in the memory 176), the unique identifier 106 may be associated with the serial number 124 of the product 122. In certain embodiments, the security token 104 may be determined to be validated when the unique identifier 106 corresponds to an expected unique identifier 106 associated with the security token 104.

In certain embodiments, the product 122 is authenticated (e.g., via the processor 172, remote server 150, production line server 140, and/or the token server 130) in response to the token 104 being verified.

In certain embodiments, the security token 104 may be on one of the first plurality of tokens 104 transmitted by the remote server 150 to the production line server 140 in response to the production line server 140 requesting the remote server 150 to provide the first plurality of tokens 104 for a component or product line 606.

In certain embodiments, the first plurality of tokens 104 may be divided into batches in response to the wireless communication channel reliability between the remote server 150 and the production line server 140 is determined to be less than a threshold percentage (e.g., less than 70%, 65%, etc.). In certain embodiments, the security token 104 may be transmitted in one of the batches to the production line server 140. In certain embodiments, each batch from the batches may be transmitted to the production line server 140 one at a time.

In certain embodiments, the wireless communication channel reliability between the remote server 150 and the production line server 140 may be determined to be less than the threshold percentage when a wireless communication speed between the remote server 150 and the production line server 140 is less than a threshold speed.

In certain embodiments, the security token 104 may be one of a second plurality of security tokens 104 transmitted by the token server 130 to the remote server 150 in response to the remote server 150 requesting the token server 130 to provide the second plurality of security tokens 104 for a product line 606 associated with the product 122.

In certain embodiments, in response to participating in the secured communication channel with the user device 120, the product 122 becomes controllable from the user device 120. In certain embodiments, the product 122 is a thermostat.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus that utilizes a security token, comprising:
a memory configured to store a security token, wherein the security token is a software security artifact used to uniquely identify the apparatus, wherein the apparatus comprises a product in a heating, ventilation, and air conditioning (HVAC) system, wherein the product is associated with a serial number; and
a processor operably coupled with the memory, and configured to:
receive a request to store the security token in the memory;
store the security token in the memory such that the security token is retrievable in conjunction with a query message to provide the security token, wherein the security token is associated with a unique identifier that uniquely identifies the security token, and wherein in conjunction with the security token being stored in the memory:
the serial number is associated with the security token; and
the unique identifier is associated with the serial number associated with the product;
receive the query message to provide the security token;
transmit the security token to be verified, wherein the security token is determined to be verified when (a) the serial number corresponds to an expected serial number associated with the security token, and (b) the unique identifier corresponds to an expected unique identifier associated with the security token;
in response to the security token being verified:
participate in a secured communication channel with a user device such that the product becomes controllable from the user device;
receive a second security token, wherein the second security token is used for a subsequent authentication of the apparatus; and
store the second security token in the memory.

2. The apparatus of claim 1, wherein the processor is further configured to authenticate the apparatus in response to the security token being verified.

3. The apparatus of claim 1, wherein:
the security token is one of a first plurality of security tokens transmitted by a remote server to a production line server in response to the production line server requesting the remote server to provide the first plurality of security tokens designated for a component line associated with the apparatus;
the first plurality of security tokens are divided into batches in response to a wireless communication channel reliability between the remote server and the production line server determined to be less than a threshold percentage;
the security token is transmitted in one of the batches to the production line server; and
each batch from the batches is transmitted to the production line server one at a time.

4. The apparatus of claim 3, wherein the wireless communication channel reliability between the remote server and the production line server is determined to be less than the threshold percentage when a wireless communication speed between the processor and the production line server is less than a threshold speed.

5. The apparatus of claim 1, wherein the security token is one of a second plurality of security tokens transmitted by a token server to a remote server in response to the remote server requesting the token server to provide the second plurality of security tokens for a component line associated with the apparatus.

6. A method operated by an apparatus that utilizes a security token, comprising:
storing a security token in a memory of the apparatus, wherein the security token is a software security artifact used to uniquely identify an apparatus, wherein the apparatus comprises a product in a heating, ventilation, and air conditioning (HVAC) system, wherein the product is associated with a serial number;
receiving a request to store the security token in the memory;
storing the security token in the memory such that the security token is retrievable in conjunction with a query message to provide the security token, wherein the security token is associated with a unique identifier that uniquely identifies the security token, and wherein when the security token is stored in the memory:
the serial number is associated with the security token; and
the unique identifier is associated with the serial number associated with the product;
receiving the query message to provide the security token;
transmitting the security token to be verified, wherein the security token is determined to be verified when (a) the serial number corresponds to an expected serial number associated with the security token, and (b) the unique identifier corresponds to an expected unique identifier associated with the security token;
in response to the security token being verified:
participating in a secured communication channel with a user device such that the product becomes controllable from the user device;
receiving a second security token, wherein the second security token is used for a subsequent authentication of the apparatus; and
storing the second security token in a memory associated with the apparatus.

7. The method of claim 6, further comprising authenticating the apparatus in response to the security token being verified.

8. The method of claim 6, wherein:
the security token is one of a first plurality of security tokens transmitted by a remote server to a production line server in response to the production line server requesting the remote server to provide the first plurality of security tokens designated for a component line associated with the apparatus;
the first plurality of security tokens are divided into batches in response to a wireless communication channel reliability between the remote server and the production line server determined to be less than a threshold percentage;
the security token is transmitted in one of the batches to the production line server; and
each batch from the batches is transmitted to the production line server one at a time.

9. The method of claim 8, wherein the wireless communication channel reliability between the remote server and the production line server is determined to be less than the threshold percentage when a wireless communication speed between the remote server and the production line server is less than a threshold speed.

10. The method of claim 6, wherein the security token is one of a second plurality of security tokens transmitted by a token server to a remote server in response to the remote server requesting the token server to provide the second plurality of security tokens for a component line associated with the apparatus.

11. A non-transitory computer-readable medium that stores instructions, wherein when the instructions are executed by one or more processors, causes the one or more processors to:
store a security token in a memory of an apparatus, wherein the security token is a software security artifact used to uniquely identify the apparatus, wherein the apparatus comprises a product in a heating, ventilation, and air conditioning (HVAC) system, wherein the product is associated with a serial number;
receive a request to store the security token in the memory;
store the security token in the memory such that the security token is retrievable in conjunction with a query message to provide the security token, wherein the security token is associated with a unique identifier that uniquely identifies the securitytoken, and wherein in conjunction with the security token being stored in the memory:
the serial number is associated with the security token; and
the unique identifier is associated with the serial number associated with the product;
receive the query message to provide the security token;
transmit the security token to be verified, wherein the security token is determined to be verified when (a) the serial number corresponds to an expected serial number associated with the securitytoken, and (b) the unique identifier corresponds to an expected unique identifier associated with the security token;
in response to the securitytoken being verified:
participate in a secured communication channel with a user device such that the product becomes controllable from the user device;
receive a second security token, wherein the second securitytoken is used for a subsequent authentication of the apparatus; and
store the second securitytoken in a memory associated with the apparatus.

12. The non-transitory computer-readable medium of claim 11, wherein the instructions when executed by the one or more processors, further cause the one or more processors to authenticate the apparatus in response to the security token being verified.

13. The non-transitory computer-readable medium of claim 11, wherein the apparatus is a thermostat.

* * * * *